(12) United States Patent
Thomas et al.

(10) Patent No.: US 11,036,755 B2
(45) Date of Patent: Jun. 15, 2021

(54) SYSTEMS AND METHODS FOR SEARCHING FOR AND TRANSLATING REAL ESTATE DESCRIPTIONS FROM DIVERSE SOURCES UTILIZING AN OPERATOR-BASED PRODUCT DEFINITION

(71) Applicant: Market Data Service LLC, Layton, UT (US)

(72) Inventors: Gilbert Allan Thomas, American Fork, UT (US); Scott Hintze, Ogden, UT (US); Daniel Stamey, Roy, UT (US)

(73) Assignee: Market Data Service LLC, Layton, UT (US)

( * ) Notice: Subject to any disclaimer, the term of this patent is extended or adjusted under 35 U.S.C. 154(b) by 281 days.

(21) Appl. No.: 16/195,549

(22) Filed: Nov. 19, 2018

(65) Prior Publication Data

US 2019/0087872 A1 Mar. 21, 2019

Related U.S. Application Data

(63) Continuation of application No. 14/677,928, filed on Apr. 2, 2015, now Pat. No. 10,134,063, which is a continuation-in-part of application No. 13/290,020, filed on Nov. 4, 2011, now Pat. No. 9,224,177.

(60) Provisional application No. 61/463,356, filed on Feb. 16, 2011, provisional application No. 61/439,835, filed on Feb. 5, 2011, provisional application No. 61/410,848, filed on Nov. 5, 2010.

(51) Int. Cl.
*G06F 16/25* (2019.01)
*G06Q 30/02* (2012.01)
*G06Q 50/16* (2012.01)
*G06F 16/215* (2019.01)
*G06F 16/23* (2019.01)

(52) U.S. Cl.
CPC ......... *G06F 16/258* (2019.01); *G06F 16/215* (2019.01); *G06F 16/2365* (2019.01); *G06Q 30/0278* (2013.01); *G06Q 50/16* (2013.01)

(58) Field of Classification Search
CPC ... G06F 16/258; G06F 16/215; G06F 16/2365
See application file for complete search history.

(56) References Cited

U.S. PATENT DOCUMENTS

| | | | |
|---|---|---|---|
| 2002/0194196 A1* | 12/2002 | Weinberg | G06F 16/258 |
| 2004/0117377 A1 | 6/2004 | Moser et al. | |
| 2004/0153432 A1 | 8/2004 | O'Halloran et al. | |
| 2005/0114306 A1 | 5/2005 | Shu et al. | |
| 2005/0289123 A1 | 12/2005 | Dettinger et al. | |
| 2007/0050342 A1 | 3/2007 | Inkinen et al. | |
| 2008/0313225 A1* | 12/2008 | Spicer | G06F 16/955 |
| 2008/0313255 A1 | 12/2008 | Spicer et al. | |
| 2009/0024551 A1* | 1/2009 | Agrawal | G06N 5/02 706/47 |
| 2009/0150442 A1* | 6/2009 | Barnard | G06Q 30/02 |
| 2010/0145902 A1 | 6/2010 | Boyan et al. | |
| 2011/0004608 A1 | 1/2011 | Solaro et al. | |
| 2011/0202513 A1 | 8/2011 | Singh | |
| 2011/0256889 A1 | 10/2011 | Polis et al. | |

(Continued)

*Primary Examiner* — Grace Park
(74) *Attorney, Agent, or Firm* — Terrence J. Edwards; TechLaw Ventures, PLLC

(57) ABSTRACT

Systems and methods for managing, generating, and reporting real estate data from a plurality of source databases that are distributed over a computer network are disclosed and described.

20 Claims, 31 Drawing Sheets

(56) References Cited

U.S. PATENT DOCUMENTS

2012/0209837 A1    8/2012   Hintze et al.
2012/0209876 A1    8/2012   Thomas et al.

\* cited by examiner

- PrefixOperator_1
  - Inputs
    - Value_1
      - Parameter Direction = Input
      - Linked Parameter = Nothing
      - Parameter Data Type = String
      - Parent = PrefixOperator_1
      - Value = "abc"
  - Outputs
    - Out_1
      - Parameter Direction = Output
      - Linked Parameter = CapitalizeOperator1.Inputs.Value_1
      - Parameter Data Type = String
      - Parent = PrefixOperator_1
      - Value = "efgabc"
  - Run Operation()
    - Prefix the text from Value_1.Value with "efg"
- CapitalizeOperator1
  - Inputs
    - Value_1
      - Parameter Direction = Input
      - Linked Parameter = PrefixOperator_1.Outputs.Out_1
      - Parameter Data Type = String
      - Parent = PrefixOperator_1
      - Value = "efgabc"
  - Outputs
    - Out_1
      - Parameter Direction = Output
      - Linked Parameter = Nothing
      - Parameter Data Type = String
      - Parent = PrefixOperator_1
      - Value = "EFGABC"
  - RunOperation()
    - Capitalize the text from Value_1.Value.

FIG. 6

FIG. 12
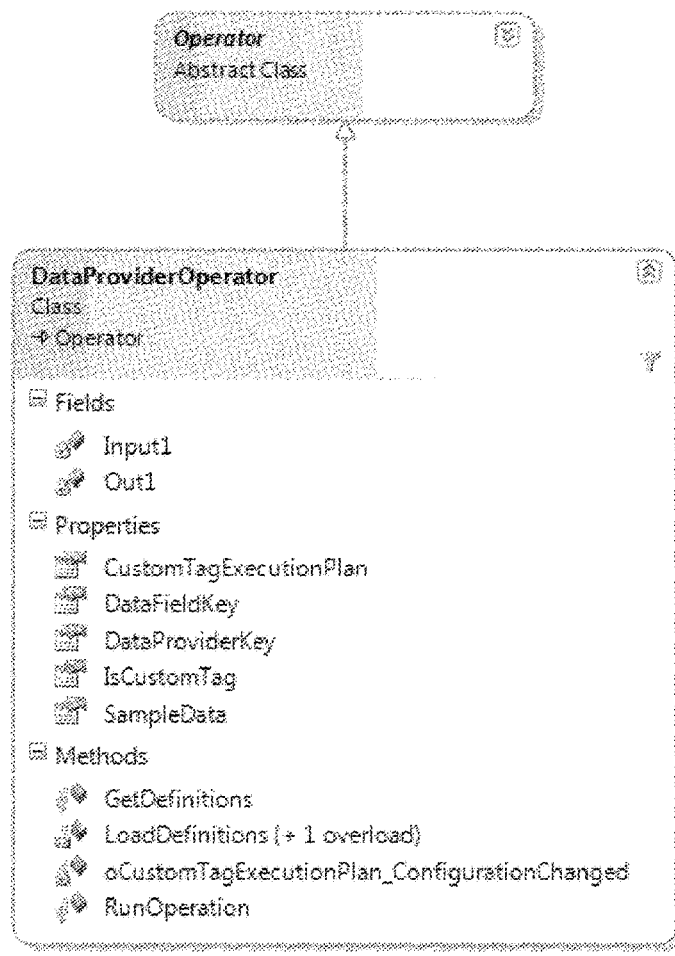
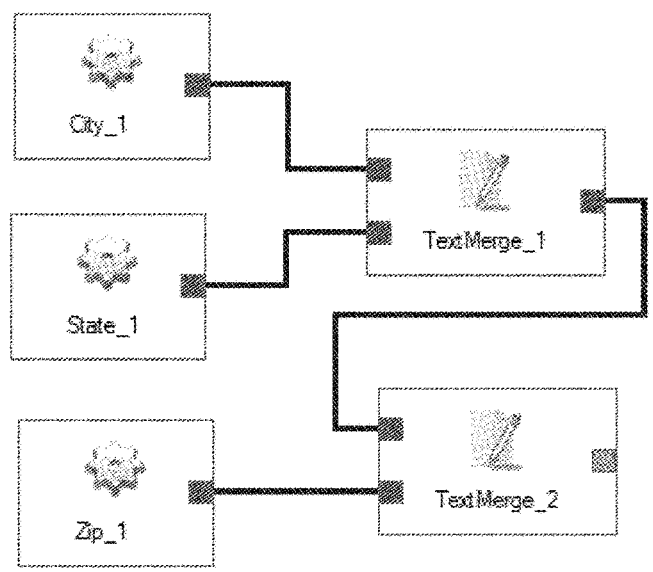
FIG. 13

```
<executionplan id="DesignStyle">
<operation id="MultiProviderMerger_1" type="DataMasterPlus.Operators.MultiProviderMerger">
      <OperatorDefinition ShowException="0" ShowAllOnLine="0" Separator="/">
        <PrioritizedElements>
<PrioritizedElement DataProviderName="Sandicor - San Diego" Priority="1"
        ExecPanXPath="MapDefinition/DataProviders/Provider[@name='Sandicor - San Diego']
        /ReportMapping/FieldMap[@ReportName='URAR-05'
        and @CommonName='DesignStyle']/Custom/executionplan[@id='DesignStyle']" />
<PrioritizedElement DataProviderName="Realist" Priority="1"
        ExecPanXPath="MapDefinition/DataProviders/Provider[@name='Realist']/ReportMapping
        /FieldMap[@ReportName='URAR-05'
        and @CommonName='DesignStyle']/Custom/executionplan[@id='DesignStyle']" />
        </PrioritizedElements>
      </OperatorDefinition>
    </operation>
    <Inputs>
      <Input id="Sandicor - San DiegoArchitectural Style"
       Name="Sandicor - San DiegoArchitectural Style" parentid="MultiProviderMerger_1" />
      <Input id="RealistStyle" Name="RealistStyle" parentid="MultiProviderMerger_1" />
    </Inputs>
    <Outputs>
      <Output id="Out1" Name="Out1" parentid="MultiProviderMerger_1" />
    </Outputs>
</executionplan>
```

FIG. 17

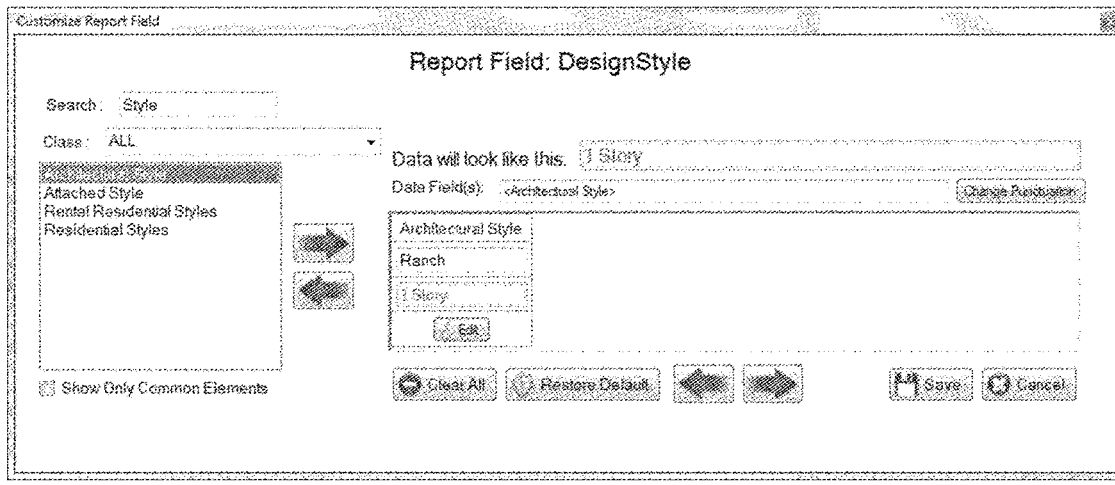

FIG. 18

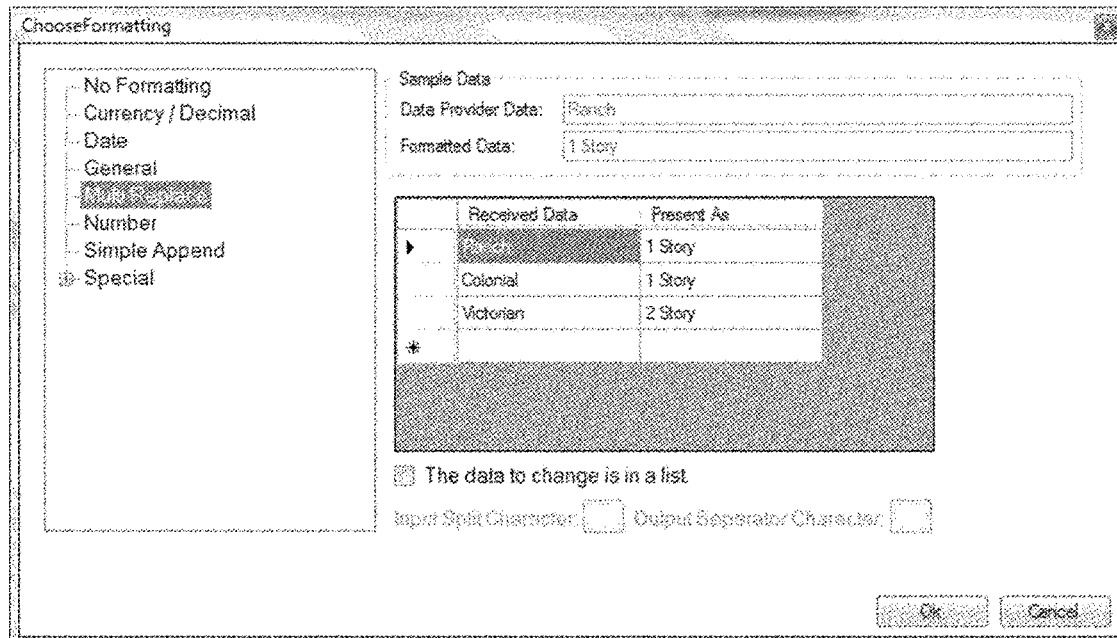

FIG. 19

```
<executionplan id="DesignStyle">
    <operation id="Architectural Style" type="DataMasterPlus.Operators.DataProviderOperator">
      <OperatorDefinition DataFieldKey="Architectural Style"
    DataProviderKey="Sandicor - San Diego" SampleData="Ranch" />
    </operation>
    <operation id="MultiReplace" type="DataMasterPlus.Operators.MultipleReplaceOperator">
      <OperatorDefinition OutputSeparator="" ParseCharacter="" DataIsList="0">
        <ConfigurationSettings ExposeConfiguration="0" ConfigurationLable="" />
        <REPLACEMENTDEFINITIONS>
          <REPLACEMENT StringToReplace="Ranch" ReplacementString="1 Story" />
          <REPLACEMENT StringToReplace="Colonial" ReplacementString="1 Story" />
          <REPLACEMENT StringToReplace="Victorian" ReplacementString="2 Story" />
        </REPLACEMENTDEFINITIONS>
      </OperatorDefinition>
    </operation>
    <OperatorParameterLink parentid1="Architectural Style"
    parentid2="MultiReplace" Name1="Architectural Style_Out" Name2="Value1" />
    <Inputs>
      <Input id="Architectural Style" Name="Architectural Style" parentid="Architectural Style" />
    </Inputs>
    <Outputs>
      <Output id="Out1" Name="Out1" parentid="MultiReplace" />
    </Outputs>
</executionplan>
```

FIG. 21

```xml
<executionplan id="TotalAboveGradeBathrooms">
    <operation id="Bath Count Formattable"
    type="DataMasterPlus.Operators.DataProviderOperator">
        <OperatorDefinition DataFieldKey="Bath Count Formattable"
    DataProviderKey="Sandicor - San Diego" SampleData="2.0.1.0">
            <executionplan id="Bath Count Formattable">
                <operation id="BathFormat_1" type="DataMasterPlus.Operators.BathFormatOperator">
<OperatorDefinition bCombineQuarterBaths="False" bEnumerationChecked="False" Full=""
    Quarter3="" Half="" Quarter1="" bStandardChecked="True" StandardSeparator=""
    bCombinedChecked="False" bSeparateMultiples="False">
            <ConfigurationSettings ExposeConfiguration="1"
    ConfigurationLable="Bath Formatting" />
            </OperatorDefinition>
            </operation>
            <operation id="Baths Full_2" type="DataMasterPlus.Operators.DataProviderOperator">
                <OperatorDefinition DataFieldKey="Baths Full"
    DataProviderKey="Sandicor - San Diego" SampleData="2" />
            </operation>
            <operation id="Baths Half_2" type="DataMasterPlus.Operators.DataProviderOperator">
                <OperatorDefinition DataFieldKey="Baths Half"
    DataProviderKey="Sandicor - San Diego" SampleData="1" />
            </operation>
            <OperatorParameterLink parentid1="BathFormat_1" parentid2="Baths Full_2"
    Name1="FullBath" Name2="Baths Full_Out" />
            <OperatorParameterLink parentid1="BathFormat_1" parentid2="Baths Half_2"
    Name1="HalfBath" Name2="Baths Half_Out" />
                <Inputs>
                  <Input id="Full" Name="Baths Full" parentid="Baths Full_2" />
                  <Input id="Half" Name="Baths Half" parentid="Baths Half_2" />
                </Inputs>
                <ConstantInputs>
                  <Constant operationid="BathFormat_1" inputid="Quarter3Bath" Value="0" />
                  <Constant operationid="BathFormat_1" inputid="Quarter1Bath" Value="0" />
                </ConstantInputs>
                <Outputs>
                  <Output id="Out1" Name="Out1" parentid="BathFormat_1" />
                </Outputs>
              </executionplan>
            </OperatorDefinition>
        </operation>
        <Inputs>
          <Input id="Full" Name="Full" parentid="Bath Count Formattable" />
          <Input id="Half" Name="Half" parentid="Bath Count Formattable" />
        </Inputs>
        <Outputs>
          <Output id="Out1" Name="Bath Count Formattable_Out"
    parentid="Bath Count Formattable" />
        </Outputs>
</executionplan>
```

```xml
<executionplan id="Address2">
<operation id="City_1" type="DataMasterPlus.Operators.DataProviderOperator">
<OperatorDefinition DataFieldKey="City" DataProviderKey="Coastal Realtors MLS" SampleData="Salisbury" />
</operation>
<operation id="TextMerge_1" type="DataMasterPlus.Operators.TextMergeOperator">
<OperatorDefinition Separator="," ">
<ConfigurationSettings ExposeConfiguration="0" ConfigurationLable="" />
</OperatorDefinition>
</operation>
<operation id="State_1" type="DataMasterPlus.Operators.DataProviderOperator">
<OperatorDefinition DataFieldKey="State" DataProviderKey="Coastal Realtors MLS" SampleData="MD" />
</operation>
<operation id="TextMerge_2" type="DataMasterPlus.Operators.TextMergeOperator">
<OperatorDefinition Separator=" ">
<ConfigurationSettings ExposeConfiguration="0" ConfigurationLable="" />
</OperatorDefinition>
</operation>
<operation id="Zip_1" type="DataMasterPlus.Operators.DataProviderOperator">
<OperatorDefinition DataFieldKey="Zip" DataProviderKey="Coastal Realtors MLS" SampleData="21801" />
</operation>
<OperatorParameterLink parentid1="City_1" parentid2="TextMerge_1" Name1="City_Out" Name2="Value1" />
<OperatorParameterLink parentid1="State_1" parentid2="TextMerge_1" Name1="State_Out" Name2="Value2" />
<OperatorParameterLink parentid1="TextMerge_1" parentid2="TextMerge_2" Name1="Out1" Name2="Value1" />
<OperatorParameterLink parentid1="Zip_1" parentid2="TextMerge_2" Name1="Zip_Out" Name2="Value2" />
<Inputs>
<Input id="City" Name="City" parentid="City_1" />
<Input id="State" Name="State" parentid="State_1" />
<Input id="Zip" Name="Zip" parentid="Zip_1" />
</Inputs>
<Outputs>
<Output id="Out1" Name="Out1" parentid="TextMerge_2" />
</Outputs>
</executionplan>
```

| FEATURE | SUBJECT | COMPARABLE SALE NO. 1 | | COMPARABLE SALE NO. 2 | | COMPARABLE SALE NO. 3 | |
|---|---|---|---|---|---|---|---|
| 1110 Fort Lane | | 1106 E Fort Ln | | 1432 Olympic Ln | | 1430 Olympic Ln | |
| Address Ogden, UT 84404 | | Ogden, UT 84404 | | Ogden, UT 84404 | | Ogden, UT 84404 | |
| Proximity to Subject | | 0.01 miles SW | | 0.09 miles NW | | 0.10 miles NW | |
| Sale Price | $ 135,000 | $ 134,500 | | $ 129,000 | | $ 128,000 | |
| Sale Price/Gross Liv Area | $ 89.82 sq.ft. | $ 99.78 sq.ft. | | $ 92.41 sq.ft. | | $ 84.77 sq.ft. | |
| Data Source(s) | | WFRMLS#1215777 DOM 25 | | WFRMLS#1243193 DOM 7 | | WFRMLS#1239379 DOM 20 | |
| Verification Source(s) | | Doc#2698524 06/06/2014 | | Doc#2698523 08/19/2014 | | Doc#2696800 08/01/2014 | |
| VALUE ADJUSTMENTS | DESCRIPTION | DESCRIPTION | +(-) $ Adjustment | DESCRIPTION | +(-) $ Adjustment | DESCRIPTION | +(-) $ Adjustment |
| Sale or Financing | | ArmLth | | ArmLth | | ArmLth | |
| Concessions | | FHA;6500 | | FHA;4700 | | Cash;0 | |
| Date of Sale/Time | | s06/14;c04/14 | | s08/14;c07/14 | | s07/14;c07/14 | |
| Location | N;Res. | N;Res. | | N;Res. | | N;Res. | |
| Leasehold/Fee Simple | Fee Simple | Fee Simple | | Fee Simple | | Fee Simple | |
| Site | 3485 sf | 4356 sf | 0 | 3485 sf | | 3485 sf | |
| View | N;Res. | N;Res. | | N;Res. | | N;Res. | |
| Design (Style) | SD2;Twn/RwEnd | SD2;Twn/RwEnd | | AT2;Twn/RwMid | | SD2;Twn/RwEnd | |
| Quality of Construction | Q4 | Q4 | | Q4 | | Q4 | |
| Actual Age | 10 | 10 | | 14 | | 14 | |
| Condition | C3 | C3 | | C3 | | C3 | |
| Above Grade Room Count | Tot 5 / Bdrm 3 / Baths 2.1 | Tot 5 / Bdrm 3 / Baths 2.1 | | Tot 5 / Bdrm 3 / Baths 2.1 | | Tot 5 / Bdrm 3 / Baths 2.1 | |
| Gross Living Area | 1,503 sq.ft. | 1,348 sq.ft. | | 1,396 sq.ft. | | 1,510 sq.ft. | |
| Basement & Finished Rooms Below Grade | 0sf | 0sf | | 0sf | | 0sf | |
| Functional Utility | Good | Good | | Good | | Good | |
| Heating/Cooling | GFWA/CAC | GFWA/CAC | | GFWA/CAC | | GFWA/CAC | |
| Energy Efficient Items | Thermopane | Thermopane | | Thermopane | | Thermopane | |
| Garage/Carport | 1gb/2dw | 1ga1dw | | 1ga1dw | | 1ga1dw | |
| Porch/Patio/Deck | CvdPrchPto | PrchPto | | PrchPto | | CvdPrchPto | |
| Fireplaces | 1 Fplc | 0 Fplcs | | 1 Fplc | | 1 Fplc | |
| Extras Etc. | R/O,DWR,MW | R/O,DWR,MW | | R/O,DWR,MW | | R/O,DWR,MW | |
| Landscaping | Lndscp | Lndscp | | Lndscp | | Lndscp | |
| Net Adjustment (Total) | | +/- | $ 0 | +/- | $ 0 | +/- | $ 0 |
| Adjusted Sale Price | | Net Adj. 0.0% | | Net Adj. 0.0% | | Net Adj. 0.0% | |

SYSTEMS AND METHODS FOR SEARCHING FOR AND TRANSLATING REAL ESTATE DESCRIPTIONS FROM DIVERSE SOURCES UTILIZING AN OPERATOR-BASED PRODUCT DEFINITION

CROSS REFERENCE TO RELATED APPLICATIONS

This application is a continuation of U.S. application Ser. No. 14/677,928 Filed Apr. 2, 2015 (U.S. Pat. No. 10,134, 063), which is a continuation-in-part of U.S. application Ser. No. 13/290,020, filed on Nov. 4, 2011 (U.S. Pat. No. 9,224,177), which claimed the benefit of U.S. Provisional Application No. 61/410,848, filed Nov. 5, 2010, and U.S. Provisional Application No. 61/439,835, filed Feb. 5, 2011, and U.S. Provisional Application No. 61/463,356, filed Feb. 16, 2011, each of which are incorporated by reference herein in their entirety, including, but not limited to, those portions that specifically appear hereinafter, the incorporation by reference being made with the following exception: In the event that any portion of the above-referenced applications are inconsistent with this application, this application supercedes said above-referenced applications.

TECHNICAL FIELD

The disclosure relates to the creation of custom reports, and software products for creating custom reports, representing real property and its characteristics for appraisals, listings, litigation, lending, and other like real property matters.

BACKGROUND

The appraisal industry originated from a need to valuate real property, such as surrounding the sale or insurance of a home, building or other improvement to land. The traditional process, as shown in FIG. 1, involved an individual called an appraiser 14, whose assignment it was to attribute a value to a piece of property, while possibly verifying the characteristics of that property in the process. To perform this function the appraiser 14 would receive a description of property 12, minimally identifying the property to appraise the value of, but preferably also describing the attributes of the property such as the type, area, style, etc. Property description 12 might also include an inspection report. Property description 12 might also be a simple appraisal order containing an identification of a property, such as an address. Before the widespread use of computers and networking, the appraiser 14 would ordinarily consult real estate records 11, whose usual location was at the county land records office. Records 11 would contain descriptions and amounts of the sale of properties within a given locality, which appraiser 14 could compare against a property description 12 to assign a value. Appraiser would identify properties within records 11 that were comparatively close to property description 12, resulting in the identification of "comparables". Upon a sufficient number of comparables, appraiser 14 would attribute a value to the property of property description 12, and release an appraisal report 15 for the requesting party. In can be appreciated that the appraisers of yesterday spent a significant amount of time in the land records office finding comparables, which was inconvenient.

Therefore, it was known to keep a collection of files 13 which the appraiser could refer to reduce his workload and time in finding comparable properties. Other files might also be consulted, including property inspection reports. However, the appraiser 14 was still required to visit records 11 to update his knowledge of sale values, with fluctuations in the market and the devaluation of currency due to inflation.

The technology of appraisals has improved over the years, such that it is no longer necessary to visit the land records office, or to keep extensive on-site files containing comparables. However, a desirable appraisal may need to consult with a number of data sources, which are now described.

The traditional source of public records remains available to the appraiser. Unfortunately, the history of these public records varies from locality to locality, such that there is no unified repository that can be consulted. In many cases, these public records are managed at the county level. Often there is one office that may be consulted housing the land records of the county, where transactions may be recorded. Even if that is so, however, many records regarding land may be located elsewhere. There may be a county recorder office charged to "record" all information in the public records requested or required by the general public, including property owners, lenders, court systems, etc. Appraisal-related information obtained from this office typically includes legal descriptions of each individual property parcel in its county, plat maps showing those parcels, and information regarding ownership and interest therein. Recorded in this office may also be information regarding transactions regarding land, such as prices paid.

There may also be other county offices that an appraiser might consult. One of these might be a county assessor's office, which is typically tasked with keeping informational records on the land parcels in the county, which information might include an address, the year a structure was built, and various physical characteristics of land and buildings. This office is also typically tasked with periodically estimating a value for parcels, usually annually, which might be of interest when conducting an appraisal. This need not be the only office of this kind: in Texas, for example, there are "valuation districts" that are located within larger county jurisdictions that serve the same function. Other county offices that might manage information useful in the performance of an appraisal might include a county treasurer office, often calculating property values in the collection of property taxes, or other offices that perform land planning, building, zoning, auditing, engineering, surveying, or the management of other records regarding health, public safety, and technological improvements such as for communications.

At the city level, records of interest in appraisal are also kept. These typically involve building codes, zoning histories, subdivision approvals, and building and land development rules, regulations and policies, all of which are managed by each individual city. Many cities have various engineering policies, procedures and documentations that govern or affect the development and general use of real property. As well as written records, there may be various kinds of maps to be consulted. Cities also keep records specific to properties concerning actions, permissions and permits granted or denied. For example, these might include building permits and related documentation, inspection records, and zoning authorizations and history records. It is not uncommon for medium or larger cities to have their own technology department to manage their various public records. In those places with townships, that can also increase the locations where appraisal-important information may be found.

Real-estate related information may be also be found at the state level. This can involve taxing commissions, departments of transportation, health, economic development, agricultural departments and census bodies.

Last mentioned herein are federal offices that manage information that might affect the appraisal of a property, including offices related to census records, health, transportation, lending and financial concerns, the IRS, agriculture, interior and the military.

There are available to real-estate agents a Multiple Listing Service (MLS), which allows such agents to enter information about specific properties that are offered for sale to the public. Such services may also keep information about properties that have sold, are currently under contract, or for which contracts have expired. Systems supporting MLSs have become the backbone of the real estate industry and are used heavily, utilizing electronic platforms that are generally large and sophisticated. Real estate appraisers have been allowed essentially read-access to the data contained in these MLSs. Although these do provide information useful in the performance of appraisals, these are restricted in their locality both geographically and by organization, as it is local boards of realtors that ordinarily own or otherwise participate in correspondingly local or at most regional MLSs. At the present time, there are some 700 to 900 local MLSs around the country. Each MLS is typically well established, having its own rules, processes and databases. There are standards for these promulgated by the National Association of Realtors, but the degree and level of compliance varies. Each system has its uniqueness, with different data structures and data elements that reflect the local or regional characteristics of the properties described. While most of these systems have export capabilities, these have their limitations in extractions, formats and presentations to appraisers, who ordinarily find that much of the information received requeries further manual processing.

Appraisers also have available to the commercial data service companies, which use their own proprietary platforms, database constructions and delivery systems. For example, such a company might purchase data from public records, MLS data, individual appraisers and other sources, merge it, combine it, repackage it and then resell it in a large block of data. Appraisers have made use of these services, although the information has been organized in such a proprietary nature that appraisers have found manual refinements to be required. Some appraisers have attempted to organize their own services in a local or regional co-op, but these have not solved the problems with non-standardizations of data formats.

The final source to be mentioned that an appraiser might rely upon is his own files. In the process of completing appraisals, appraisers typically keep data on the subject properties. This data source is usually kept in databases and file structures unique to the individual software package purchased from one of the five or six supplying vendors. The data in an appraisers file may or may not have been manipulated to meet personal style or structure, and cannot be relied upon without familiarity of this source by the appraiser desiring use of it.

Disclosed herein are systems capable of searching, receiving and conglomerating the data from databases structured in varying formats containing real estate data, translating the data received into a common format using a rules or other structures tailored to the format from which the data originated. These translations may be performed through the execution of predefined rules referencing data tags used within the system and/or within the originating databases. These rules may be constructed in a simple form, but may also be structured in a hierarchy or a class-based structure whereby one rule depends upon the output of another rule for its input. Data sources can be prioritized or merged where the same property-related information is presented in more than one source. Rules, appropriately crafted, can overcome the non-standard ways in which properties are described, allowing for uniformity in the comparison and distribution of property descriptions in appraisal. Map definitions containing rule sets can be utilized, those definitions being crafted for a particular use, such as for reports to a particular consumer or in customizations for a particular user or operator. Such systems may be utilized in the course of real estate appraisals, or in search reports for properties, extending the range of input information across databases of differing formats. Detailed information on various example embodiments of the inventions are provided in the Detailed Description below, and the inventions are defined by the appended claims.

The systems and methods described herein provide improved methods, systems, and software products for real property reporting that alleviates the above-identified limitations of existing systems.

BRIEF DESCRIPTION OF THE FIGURES

FIG. 6 shows the textual definition of two operators in the exemplary rule-based structure consistent with the principles and teachings of the disclosure.

FIG. 12 shows the organization of an exemplary operator providing data originating from a data source consistent with the principles and teachings of the disclosure.

FIG. 13 illustrates the construction of an execution plan to merge address information from small-grained fields through a hierarchy of operators consistent with the principles and teachings of the disclosure.

FIG. 14 shows the main page for the forms customization interface of the exemplary Formatter program consistent with the principles and teachings of the disclosure.

FIG. 15 shows a sample screen for selection and prioritization between two data sources of a field in a final report consistent with the principles and teachings of the disclosure.

FIG. 16 shows a textual representation of an exemplary execution plan.

FIG. 17 shows another sample screen for selection and prioritization between two data sources of a field in a final report consistent with the principles and teachings of the disclosure.

FIG. 18 shows a sample screen in the exemplary Formatter for the selection of formatting for values that might be encountered on retrieval from data sources consistent with the principles and teachings of the disclosure.

FIG. 19 shows the textual representation of an execution plan containing formatting selections as replacement strings for several architectural styles consistent with the principles and teachings of the disclosure.

FIG. 21 shows the textual representation of a sample execution plan for a custom tag consistent with the principles and teachings of the disclosure.

FIG. 23 is a textual form of a sample execution plan in the exemplary rule-based structure consistent with the principles and teachings of the disclosure.

FIG. 32 illustrates an implementation of how the same data can be formatted differently in a custom form report generator in accordance with the disclosed teachings and methods.

FIG. 33 illustrates an implementation of how the data may be used in an appraisal as generated by the custom report engine consistent with the principles and teachings of the disclosure.

FIG. 40 illustrates an embodiment of an actual custom report generated in accordance with the principles and teachings of the disclosure.

DETAILED DESCRIPTION

Figure 1:
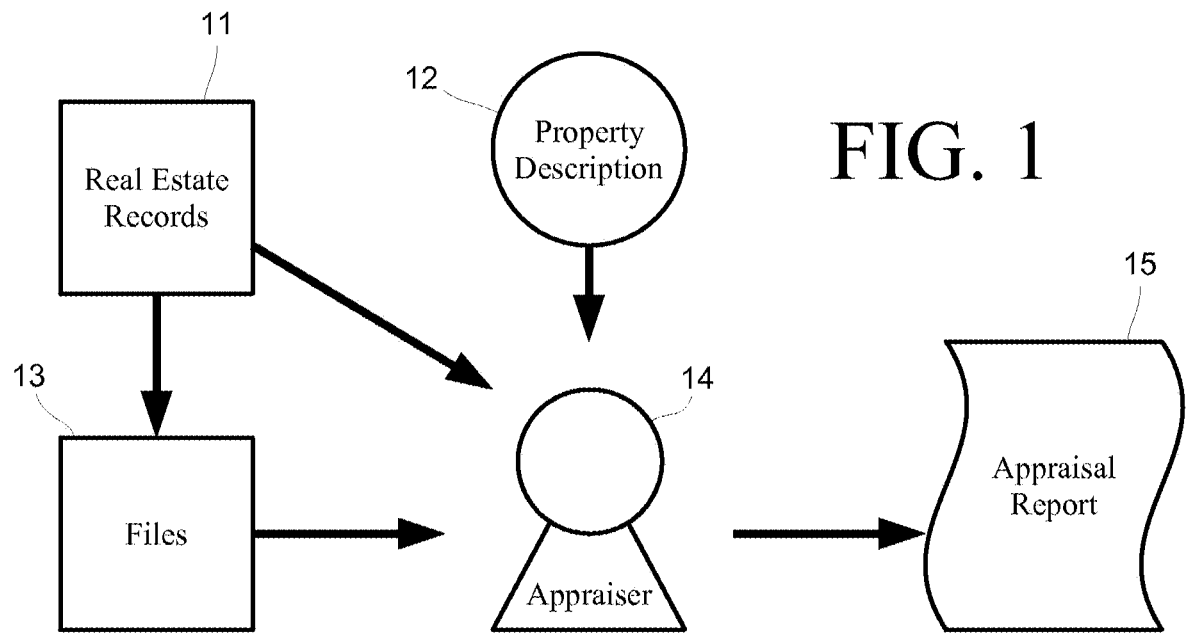
FIG. 1 illustrates the typical historical process used in land appraisals.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the disclosure. The following detailed description is, therefore, not to be taken in a limiting sense.

Reference throughout this specification to "one embodiment," "an embodiment," "an implementation," "one example" or "an example" means that a particular feature, structure or characteristic described in connection with the embodiment or example is included in at least one embodiment of the disclosure. Thus, appearances of the phrases "in one embodiment," "in an embodiment," "in an implementation," "one example" or "an example" in various places throughout this specification are not necessarily all referring to the same embodiment or example. Furthermore, the particular features, structures, databases or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments described in accordance with the disclosure may be embodied as an apparatus, method or computer program product. Accordingly, the disclosure may take the form of an entirely hardware-comprised embodiment, an entirely software-comprised embodiment (including firmware, resident software, micro-code, etc.) or an embodiment combining software and hardware aspects that may all generally be referred to herein as a "circuit," "module" or "system." Furthermore, embodiments of the disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Figure 2:
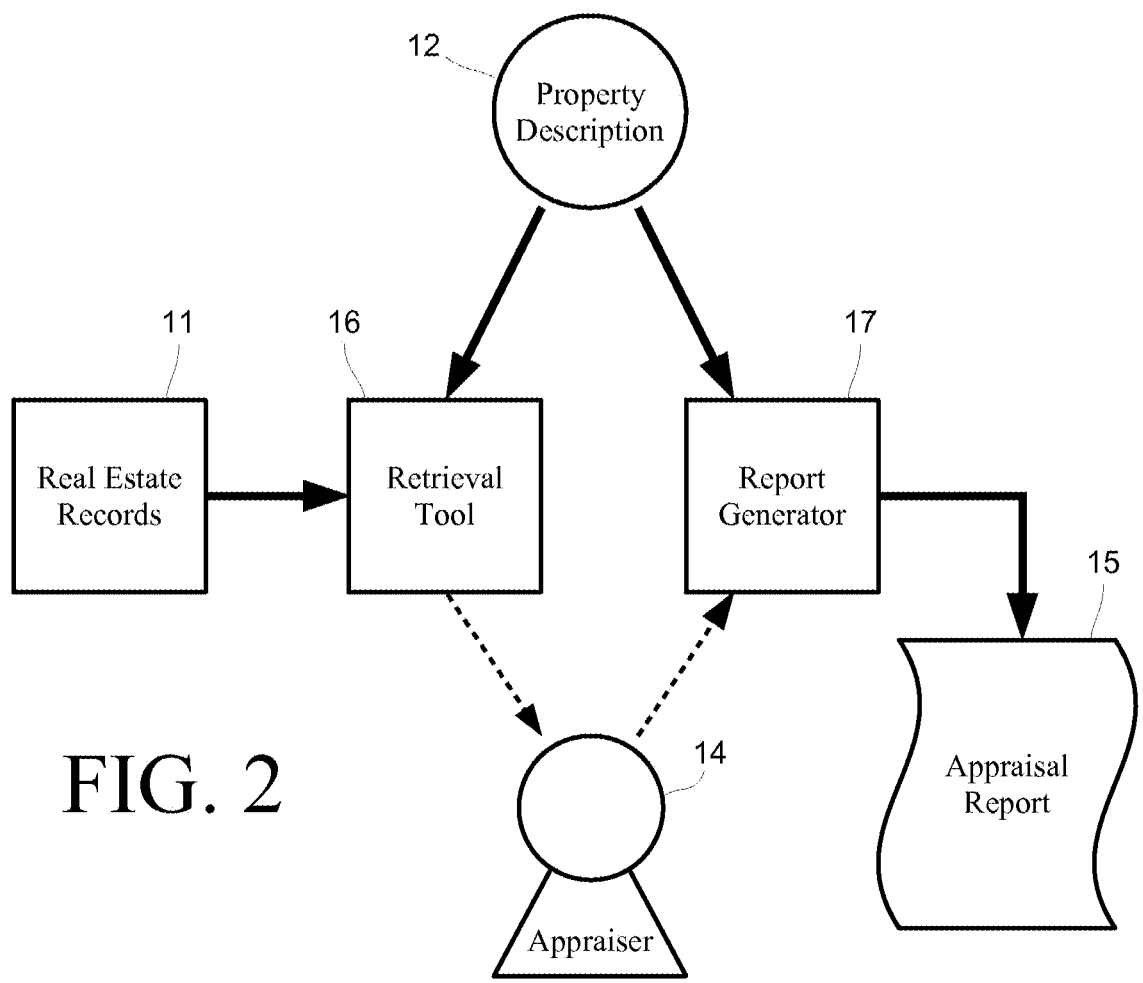
FIG. 2 shows a modern appraisal system utilizing computing resources.

Recalling the historical appraisal process, and turning now to FIG. 2, as computers became available it became possible to perform a search upon records 11 in data sources (such as those listed above) through the use of a retrieval tool 16. For example, records 11 could be made available by a land records office, and distributed in computer-readable form in a database of some kind. In such cases, retrieval tool 16 was configured to access a local database, searching it for possible comparables for presentation to the appraiser 14. In other cases, records 11 are maintained off-site, made available through network access such as over the Internet, such as for many MLS systems. A retrieval tool 16 can also be constructed to access records 11 over a network connection, utilizing whatever interfaces are made available to subscribers or to the public. The sources of information that can be made available in a database are not limited to county land records and MLS records, but also includes records of county assessors, county recorders, treasurers, other appraisers, builders, developers, and FSBO (for sale by owner) listings, among other data sources including the ones listed above.

To use a retrieval tool 16, a property description 12 is provided for the purpose of performing a search. This description may include such things as mentioned before, size, number of floors, year built, etc., and may also include the location or locality of the property. The retrieval tool 16 may then search through records 11, which search may be performed either within a locally-hosted database or by a search facility in connection with a network access point to the records, such as a remotely operated server.

Upon completion of the search, an appraiser 14 may be presented with comparables information, which he may incorporate into a report. To that end, appraiser 14 may enter such information into a report generator 17, which may also accept the property description used in the search. In prior methods, report generator was simply a word processor operated by the appraiser, from which the report 15 was generated. Software now exists that provides relief for some of this data entry, but the existing systems maintain a limited functionality with respect to the records sources that can be utilized, such as a source of records 11. Additionally, the existing software provides no more than simply copying of data, requiring the review and editing of the appraiser 14 for a final report.

Figure 3:
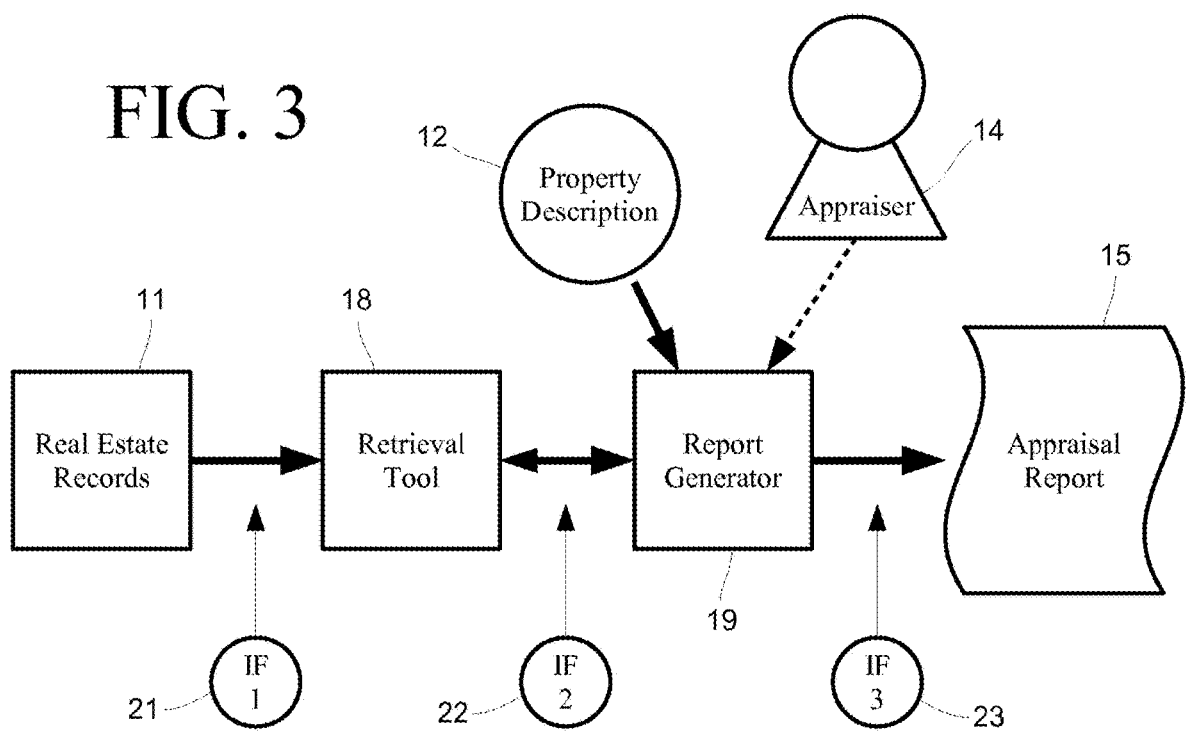
FIG. 3 shows the elements of an integrated appraisal system utilizing a retrieval tool and a report generator consistent with the principles and teachings of the disclosure.

FIG. 3 depicts an integrated process permitting the flow of data from records 11 through the entire system to an appraisal report 15, which has been elusive in practice. The process of FIG. 3 has several advantageous features, which have been difficult to achieve for reasons described below.

The stage of moving data from real estate records 11 to a retrieval tool 18 has been successfully performed, for example in the report generator product available from Market Data Service LLC of Utah, described below. Retrieval tools have successfully presented persons 14 with data from public records 11, which persons have been able to enter into a report generator 19. The relocation of data retrieved by a tool 18 into a report generator 19 has not been easy, for a number of reasons.

The first of these reasons is a lack of standards between land records offices and in the community of appraisers. Each office and each appraiser is free to utilize their own format, which produces interpretation problems to a report generator 19. Although it might be possible in some small instances for a generator to be constructed which automatically interacts with a single source of records, this has not been a cost-effective solution. Even within a single source, inconsistencies usually exist which prevent the straight and reliable transfer of information from a record to a report 15.

Leaving aside for a moment the difficulties of creating an interface between a retrieval tool 18 and a report generator 19, it can be seen that there are three base interfaces in this system, which are: the interface 21 between the retrieval tool and the records being retrieved, the interface 22 between the report generator and the retrieval tool, and the interface 23 between the report generator and the producer of the appraisal report 15. In one system, the retrieval tool 18 accesses records 11 over a network interface, and the generator 19 utilizes a printer interface in the generation of a report 15. Alternatively, a report need not be printed, but might merely be recorded to a storage device. Retrieval tool 18 may also function as a search tool, searching for property descriptions for evaluation. The interface between the retrieval tool 18 and the report generator 19 in this example is by way of an application execution interface: the retrieval tool 18 is a library or object code to generator 19, both running on the same computing platform. In another system, the retrieval tool is an independent object, called by report generator 19 and returning an export file. In another system, the retrieval tool 18 is an application residing on the same platform as generator 19 and returning an export file. In another system, report generator 19 is a web application not hosted on the same computing platform at tool 18. Thus any of interfaces 21, 22 and 23 may take many forms and be a local or a network interface, and likewise an appraisal report 15 need not be a hard-copy, but may also exist in an electronic form digitally identified with the appraiser 14.

Figure 4:
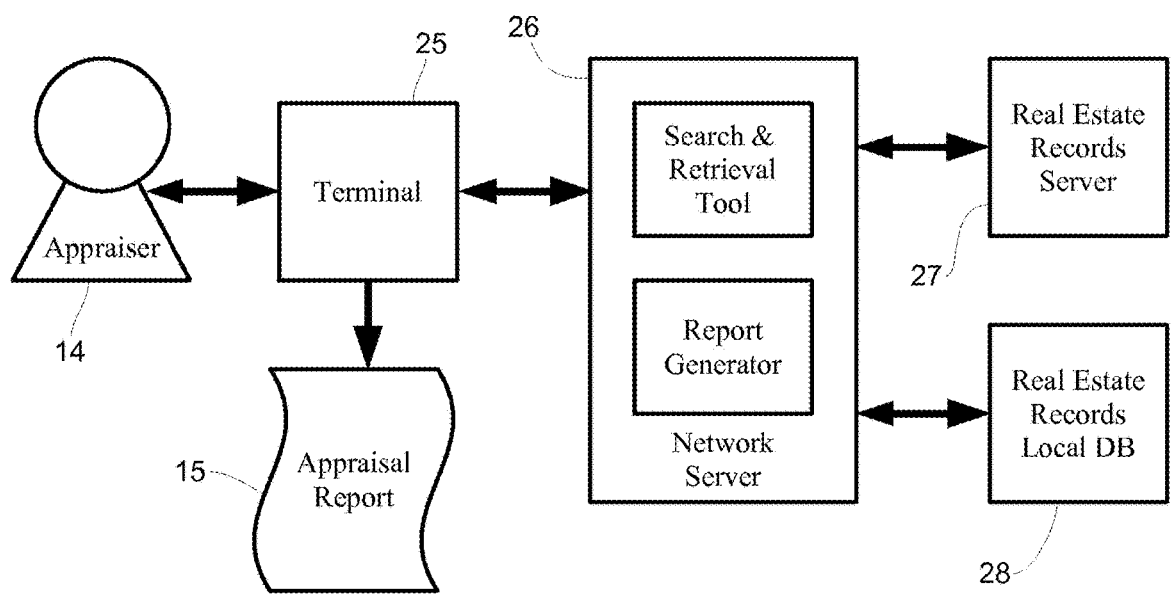
FIG. 4 shows the elements of another integrated appraisal system providing for terminal access by an operator consistent with the principles and teachings of the disclosure.

For example, looking to FIG. 4, an appraisal process may utilize a server of some kind, such as over the Internet. In this example, the retrieval tool and the report generator reside on the same network server 26, accessible over a terminal 25 made available to an appraiser 14. The appraiser operates a property search from terminal 25, which may be through the use of a web browser operating on terminal 25 and an HTML server operating at server 26, for example. The search and retrieval tool on server 26 could access data located at the server 26 in a local database 28, but in order to access the most current information the tool may access a real estate records server 27 operated by the land records office or another source of land information such as an MLS. Upon performing a search, server 26 may return the details of properties of that search to terminal 25 for the review of appraiser 14. The appraiser may then select a representative group of comparables for the report 15, which is generated and delivered to terminal 25, for example through reception at an HTML browser on terminal 25. Thus, the interfaces between components exemplified by interfaces 21, 22 and 23 may differ widely depending upon the needs, capabilities and desired arrangements of its users.

Figure 5:
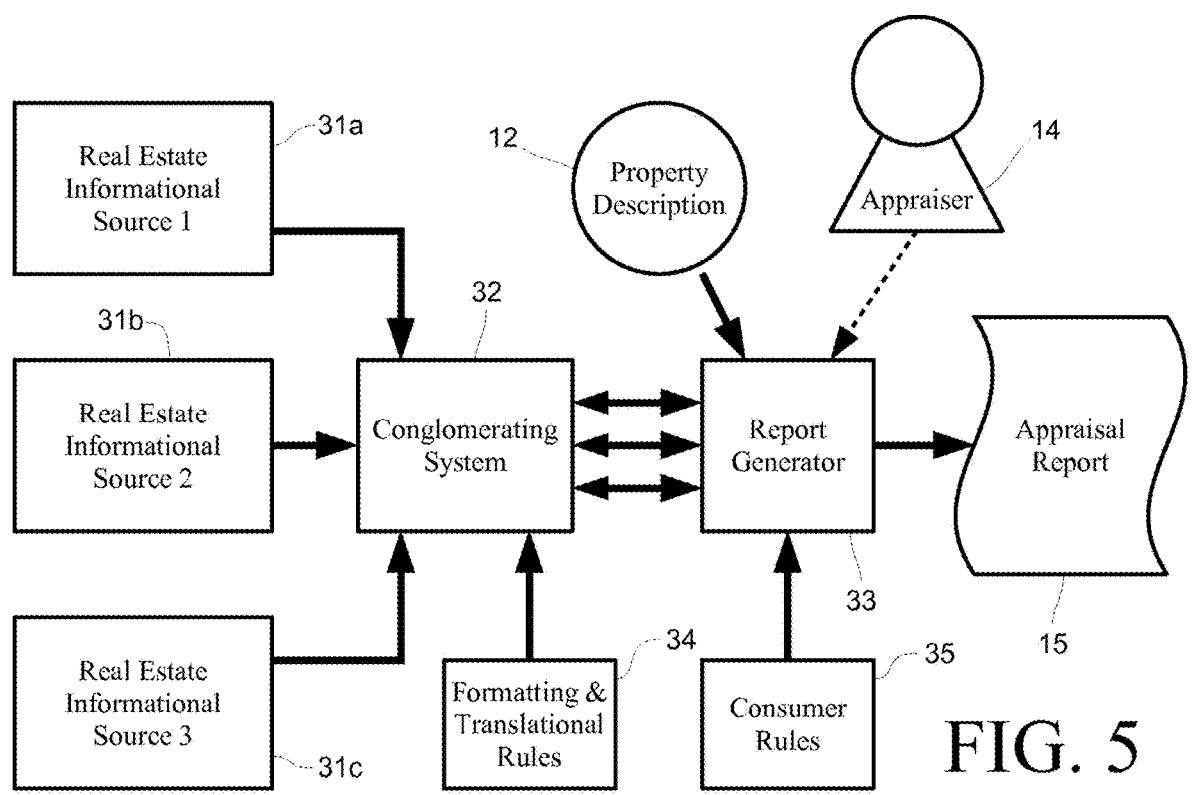
FIG. 5 shows a novel integrated appraisal system capable of receiving and conglomerating real estate information from a plurality of sources through the use of formatting and translational rules consistent with the principles and teachings of the disclosure.

Now continuing the discussion with FIG. 5, it has become possible for a multiple-source system utilized by an appraiser 14 to be operated. Recognizing that each source, here 31a, 31b and 31c, has its own format and data arrangements, the problems of the interpretation of data between a retrieval tool and a report generator are exacerbated. Sources that might be used include a Multiple Listing Service (MLS), public records, and appraiser data sharing co-operatives. Although the discussion below speaks of the operation of a system with local computing resources and remote data sources, there is nothing prohibiting the operation of the same kind of system remotely such as through a terminal as shown in FIG. 4.

In the past systems discussed above, appraisers have used various software tools to pull data from various sources, manually transferring data between them onto an appraisal report. In the system of FIG. 5, a new component is provided, which is a conglomerating system 32 that integrates and interprets the data in the various sources for use in a report generator application 33. The identification of the sources to be used are received beforehand in connection with the operation of the system. Remote sources can be interacted with through a network, but local sources might also be used, for example through a locally-installed program through inter-process communication. Again, conglomerating system might be local or remote, communicating with an application 33 through many ways including an application interface or by a network protocol. In the course of accessing the sources, search criteria will ordinarily be sent, which criteria will represent a class and locality of a property which is to be appraised or compared against. Criteria might also include a value, a sale price, a property market, a geographical region or a combination of these as desired. The sending of criteria will be done in a format compatible with each source, the response returned by each source being a property description or reference thereto whereby a description may be retrieved in conformance with the sent criteria. The criteria sent to each source may also be translated to match the capabilities and format of that source; for example a criterion might be omitted from a source that does not respond well to it.

The conglomerating system is functional to translate and interpret the information returned from queries to the various sources into a common format, providing a unified set of information to application 33. This may be performed through the reading and application of translational rules for an identified source, which will become more apparent from the discussion below. If data tags are available at the source, they may be used as references to such rules to provide identification and extraction of the characteristics of subject properties.

Provided with the conglomerating system 32, or alternatively at generator 33 or even another location, are formatting and translational rules that provide for standardization between different sources of information 31. These rules may be identified with a particular source, or alternatively may provide for auto-detection of standardization need. These rules may take the exemplary forms described below, or another form in accordance with the particular configuration of system 32 or other components. Within a system will exist a rule execution engine, which in the configuration of FIG. 5 could be modified to locate the engine either at conglomerating system 32, report generator 33, at both locations, or somewhere in-between. Such a rule execution engine may operate to apply specific rules to search terms and the terms found within the real estate informational sources 31.

Thus formatting and translational rules 34 may be applied to information from sources 31 being delivered to report 33. Other rules 34 may be applied in the course of applying search terms to sources 31, being formatted and/or translated from a property description 12 or from appraiser 14. Rules 34 may also include default sources to use where information exists in more than one of sources 31. Priority may be given within rules, which may specify one source having priority, giving priority on the basis of which data is most recent, or on the basis of which data is more reliable. Priority may indicate the elimination of a non-prioritized source, or an annotation might be provided including some or all of both sources, with the prioritized data being more prominently displayed. The application of rules may also be conditional, for conditions where a rule should be included or excluded. Rules may be simple or complex. As spoken of further below, rules may include inputs, outputs, operators, variables, exceptions, code for execution, and other features as needed to make application of a rule possible within the computing system.

Although rules 34 may be applied generically to the generation of reports, other rules 35 may be selected and applied to provide customization of reports for particular consumers. These rules may be stored at the appraiser's location if desired, however these rules may also be located in other locations, such as through the use of network access. Consumers in this context may mean a particular lender, such as a bank or governmental lending organization such as Fannie Mae or Freddie Mac. These may set forth standards for their own consumption, which rules 35 may provide conformance to. Note that with the absence of rules 34 and rules 35, appraiser 14 bears the burden of making appropriate corrections to the information to and from informational sources 31.

Consumer rules may be applied with priority over general rules, either modifying the output of the general rules or replacing them altogether. If the nesting of rules is engaged, as described below, both modification and replacement are possible.

Although prior systems were capable of accessing sources of real estate information for appraisers, these systems were focused on presentation of the information to an appraiser, and in a few cases, very simple transfers of information for the generation of an appraisal report. These systems left the final format of the information in the report solely in the care of the appraiser generating the report, who was left to examine the terms of the informational sources, and copy, format and translate these according to his best work and discretion.

Herein are presented rules, useful to apply formatting and translational corrections in the standardization of informational sources, and in conforming the informational sources to a consumer such as a lending organization or an individual appraiser.

The difficulties in the non-standardization of real estate data are many. For example, the Phoenix market uses a different set of terms than the Denver market; a home that might be described in Phoenix as adobe style would have a different label in Denver, thus making a comparison between homes in those cities difficult. Likewise descriptions of properties between databases, or even within the same database, may use nonstandard forms. For example, a property having a garage might include the text "garage", but it might also include other abbreviated forms such as "gar.", "gar", "g." or even just "G". Aspects of properties may be listed in different orders, or using different terms. For example, bathrooms might be listed in one database as being full, ¾, ½ etc. In another database, the existence of a bathroom of ½ or greater might only be noted. Thus one database may include more detail than another.

Consider a home having one full bath, one ¾ bath, one half-bath, and one quarter bath. Such might be abbreviated "1F1T1H1Q", "2F2H" (rounding quarters up to the nearest half), "1.1.1.1" (noting the presence of each and every bath), or "2.5.5" (counting the number of baths over ¾, followed by a 0.5 for each additional ½ or ¼ bath.) Likewise, a data source might present this data in four different fields, needing to be translated into a different format. These abbreviations might exist in any database, may require some interpretation and translation as comparables, and may also require translation for use in a final appraisal report.

In another example, within a regional database the style of houses might be described as ranch, colonial, Mediterranean, Victorian, Spanish, and split-level. A lender may only accept the number of stories of a building, requiring a translation from the noted style. Such translations may rely upon one element within a database, more than one element, or even more than one element from multiple databases depending upon the circumstances.

In another example, different units may be used for measurement. Measurements in square feet, acres, meters and many others may need to be converted to allow for comparison or for insertion into an appraisal report destined for a particular customer.

Rules, appropriately crafted, can overcome the non-standard ways in which properties are described, allowing for uniformity in the comparison and distribution of property descriptions in appraisal.

It is sometimes the case that the data of one source is more reliable or more detailed than another. However, this holds true only with respect to subsets of particular descriptive types within databases. For example, one database may be more reliable with respect to certain elements, while a second database may be more reliable for other elements. This was not appreciated in prior appraisal systems.

In other cases, elements within the same database may be more reliable than another. For example, a list price may be less reliable than a sale price for valuation of properties. Rules may be constructed that give priority to the elements of differing databases, or elements within the same database to ease the burden of consideration by an appraiser.

In some instances an appraiser may wish to include data from two data providers on a report line. For example, this might be desired where a lender wishes a verification of some data, such as the lot size of a property. In other cases an appraiser may wish to use one data source over another, but with notification that different sources do not match, such as in an exceptions report. Thus rules can be crafted to prioritize a kind of data in one database over another, or to prioritize data within the same database in the merging thereof, or to create a supplementary or annotative format for the convenience and use of a consumer.

As described in connection with FIG. 5, rules may be separated between generalized and consumer rules. These rules may be fashioned within a map definition, which map organizes the rules into a better-functioning structure. Map definitions are particularly useful as a container for rules, for the organization and transfer of rules in predefined application settings.

In one example, a map definition may include rules and operators for a software provider, for use with selected informational sources by a majority of the software's users. These rules may be tailored to a selected set of informational sources, which sources may be selected by the user/appraiser and the appropriate rules applied thereto. If the appraiser or other operator is sufficiently skilled, he might modify these rules and operators for his own informational sources, should he prefer some that are not included by default. Such a modified operator-based map definition can supply the means for persons within an office to use informational sources not available more widely, modify default rulesets where a different treatment of incoming information is desired, or supply a custom translation of data items in the course of preparing reports.

Also in that example, that map definition might also include rules created by the appraiser or his team, customized according to his needs and wishes. Thus, should an appraiser do a substantial amount of work for a particular customer, he may know that customer's preferences and build a rule set that applies those preferences automatically. For example, an appraiser might also need to set up a separate set of rules for different clients such as Bank X or Bank Y. In another example, rule sets could also be created to handle differences in appraising different price tiers of property such as homes priced up to $400,000 and other homes of larger price. Such rule sets might be incorporated into map definitions for particular customers and application, which may be retained at his site for further use or transmitted to others for their convenience as well.

A map definition might also include rules for particular consumers. For example, the software provider may include rules specifically for Freddie Mac or Fannie Mae, apart from the generalized formatting and translational rules otherwise provided, perhaps in a separate map definition. Alternatively, the consumer might supply its own map definitions for use in the submission of reports made to it.

The updating of map definitions may be by way of a file distribution: that is the software vendor may release new map definitions and new rules from time to time, either as improvements or as conditions change in the business. The updating of a map definition need not require an update to the software executables or other parts of the product; thus making the software product updatable without a complete redistribution. The updating of a map definition may be by way of the release of a file to users to copy to a particular location, or preferably the software itself may include an update utility which makes any necessary changes to the map definition files over a network or through files identified by the user. Should an operator use a remote formatting engine, his own map definitions can be supplied over the network used to access it. Likewise, a consumer might also release a map definition file for appraisers dealing with it, which could be distributed by the software vendor or by the consumer itself. Ideally, any custom rules created by a user/appraiser of the software should be maintained through updates to other rules, which may be conveniently by keeping those user rules apart in a separate file. Thus rules and operators therewith may be subdivided within a map definition according to their generality and portability, and thus be organized into separate containers such as files for distribution as desired.

As will become apparent from the discussion below, the rules in a map definition may be scripted and saved in a way so that the rules may be nested within other rules. By nesting the rules certain complex rules will only need to be defined once.

Preferably, the software includes an editing function (such as shown in the screen shots described below) so as to permit users to change consumer rules, and perhaps other rules, without editing map definition files themselves. In this way the software vendor can avoid requiring that the user/appraiser know the particular format of the rules, while at the same time permitting them the customizations they desire.

With consumer-based rules, the assemblage of consumer-based map definitions become possible. A set of rules may be provided for a particular consumer, and a choice given to the user/appraiser as to what profile of custom rules should be applied, if any. Such a choice might be retained across sessions or recorded as a default, if desired. The selection of a choice may also determine the entry of certain inputs into an appraisal report, which inputs may be determined by consumer rules as described above.

A consumer could create its own set of consumer-based map definitions based upon the needs of various customers or regulatory bodies. For example, Freddie Mac or Fannie Mac may require that report fields present data in a specific way, apart from the generalized formatting and translational rules otherwise provided. Similarly, a consumer could supply a destination with its map definition, and a report produced could be delivered to that destination as requested. A consumer could supply a map definition for each such body that it deals with, or merely one definition if it assumed the processing and final delivery. It is to be understood that the existence and use of a consumer-based map definition need not prevent the use of operator-based rules and map definitions: other non-conflicting rules can co-exist. Thus, a consumer-based map definition might include a set of sources of real estate information, which might be supplemented by the operator at the time of use. Consumers might likewise specify what data tags to use in the identification and extraction of property characteristics: assuring that the information they desire to receive is provided through a supplied map definition. Should conflicts arise between a consumer-based and an operator-based map definition, priorities can be given to resolve the conflict. Priorities can be defined by default, or be declared in the map definitions themselves.

In the residential home appraisal industry real estate appraisers get their data from a variety of data sources. These sources include but are not limited to Multiple Listing Systems (MLS), Public Records, and appraiser data sharing co-operatives. The appraisers use the data from these various data sources in the appraisal reports they create. These appraisers have various software tools to pull data from the various sources, but there has not been a tool to allow appraisers to fully customize and merge the data the way they would like it to show in their appraisal reports.

As noted in the introduction, appraisers have relatively few software tools to pull data from the various data sources. There has not been a tool that allows appraisers to fully customize and merge the data the way they need it to be and that will allow them to format the data the way they want in their appraisal reports.

The report generator an implementation the architecture of the product may pull data from various databases rather than a central database. This allows more flexibility in many ways. This feature may provide for the changing rules in the real estate data world.

In a report generator implementation, the end user can search data from his MLS and pull it into the report and profile generator. In an implementation during use, an appraiser would use a process that may include the following steps. First, an appraiser would search for data he would use from this local MLS website. Next, he would export data found to his computer. Then, the report generator product would recognize that export file, locating the MLS number of each entry to be retrieved. That number would be supplied to the RETS server, such as for example an MLS back-end server, following which the information for the MLS number would be retrieved. As necessary, the report generator may then connect to a public records provider database, send another message there and retrieve whatever public records information was available for each property pulled from the MLS. The report generator would then perform a processing step upon the information retrieved from these two databases, presenting that processed information to the appraiser. The appraiser would then have the ability to change, edit, and/or prioritize that information in various ways. When ready, and at the appraiser's command, that information would then be forwarded into the forms provided by other software packages the appraiser might have, such as those provided by other vendors such as a la mode, ACI, Clickforms, and/or SFREP. Such a process involves a Multiple Listing Service website, an MLS RETS database, the report generator product, the report generator server, a public records database, and perhaps other databases as appropriate. It also requeries the before mentioned interfaces to other software packages.

That process can be improved in several ways. First, the data from several sources of real estate information can be merged, prioritized, formatted and analyzed for consumption. Second, where multiple sources are utilized, the selection of a default data source can be provided for where the same, similar or optional data or data applied to the same field in a report is available from more than one source. Third, where rules are used, a redefinition of those rules can be allowed for without a rebuild of the software provided, potentially modifiable by an appraiser apart from a software developer. Fourth, fields within a report can be customizable to allow for specific formats for a specific type of report and/or a specific client.

The report generator custom format software tool (or the "Formatter") is a new developed program designed to merge and format data from one or more data sources. Looking to the architecture illustrated in FIG. 5, the Formatter is implementable within the conglomerating system and/or the report generator to use rules 34 and/or 35. The Formatter can take data from any number of data sources, prioritize the data, compare the data, format the data and then export a value or values that can be used by a program implanting the Formatter. The Formatter as designed can pull its definitions from an XML script document or other scriptable document type thus allowing the functionality of the Formatter to change as needed without rebuilding the software application. To that end, the Formatter may utilize a number of components including operators, operator parameters (or just parameters), execution plans, data providers, and map definitions, as will now be described.

The first component of the Formatter is called the "operator". An operator is made up of different "parameters", which parameters are broken into two main types: input and output. Input parameters are used to pass data into an operator and output parameters are used to pass formatted data out. (See FIG. 7) In the execution of the Formatter, an operator is designed to "Run" once all inputs have been initialized. When an operator runs it uses the supplied inputs and runs the operations on the supplied data as indicated by the instructions within the operator. If an operator successfully runs then it will populate its output with the resultant values.

Figure 7:
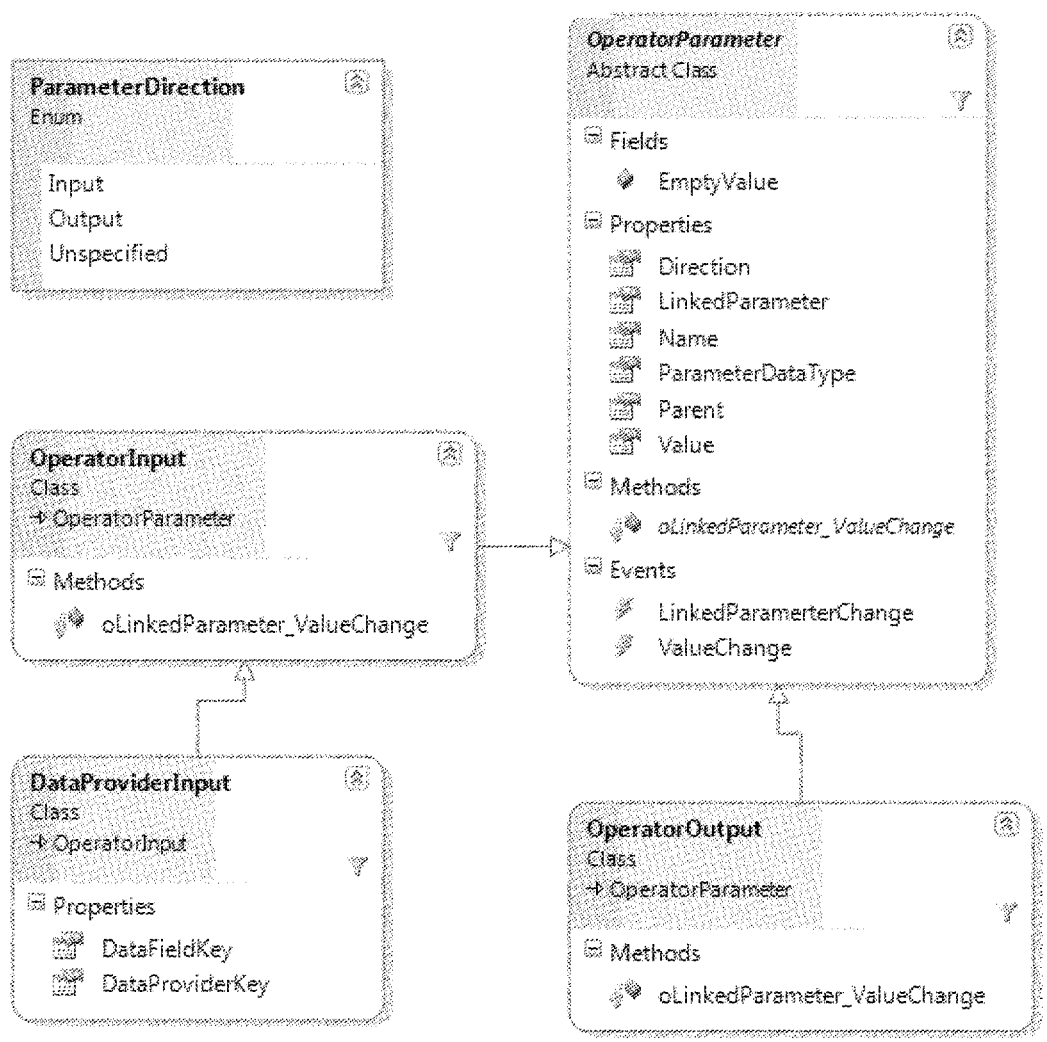
FIG. 7 shows the organization of an exemplary rule-based structure using parameters passed between operators consistent with the principles and teachings of the disclosure.
Figure 8:
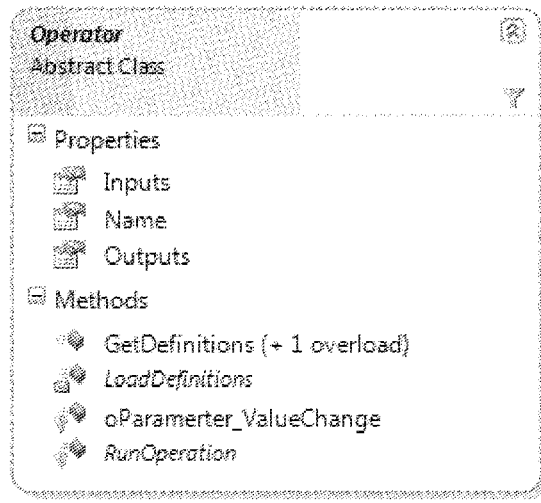
FIG. 8 shows the structure of an exemplary operator as an abstract class consistent with the principles and teachings of the disclosure.

Continuing in FIG. 7, the operator object is an abstract class as depicted in FIG. 8, and is not directly implemented within an application. The operator class must be inherited by classes that are to implement the operator functionality thus allowing the Formatter to use different operators with various inputs, outputs, and functionality. An operator could be created that would inherit its base functionality from the operator class, yet be able to specify what types of parameters are required and what functionality will be applied when the operation runs. For example: a multiplier operator (see FIG. 10) could be created that would define two numeric inputs and one output; when the operation runs it could take its two inputs, multiply them together and use the result as the output numeric value. Alternatively, the two inputs could be text; when the operation runs, it could take its two inputs, and merge them together as present the result as a single text output value.

Operator parameters are used by Operators to pass data to and get data from them. As seen in FIG. 7, an operator parameter includes the following properties: a parameter direction, a linked parameter, a parameter data type, a parent operator, and a value. The parameter direction property is used to indicate the direction of the parameter that is input or output. The linked parameter property provides a reference to another operator parameter that this parameter is linked to. The parameter data type indicates the data type that will be accepted or returned by this parameter. The parent operator is the operator that the parameter is a part of. The value property is the exposed property that can be used to get or set values for this parameter. When an operator parameter value is set or changes, the parameter fires an event notifying any linked parameters that the value has changed.

As seen in FIG. 7, another type of parameter is a data provider input parameter, which provide the entry points for data provided to the Formatter from data sources. The data provider input parameter object inherits from the input parameter object and as such can be used in place of a standard input parameter. The data provider input parameter has two additional properties which are DataProviderKey and DataFieldKey. These additional properties allow the Formatter to know how to load data to an operator from a data provider. The data provider key is a key for the data provider providing data for the input parameter. The data field key is a key for the data element or elements to be used for the input parameter. When new data is available from a data provider the data set is passed to the Formatter which can then pull the needed data elements to populate the data provider input parameters.

To make the Formatter flexible and provide for many possible custom formatting scenarios, operators can be linked in series. That is done by linking the output of one operator to the input of another. In the example of FIG. 6, one operator labeled PrefixOperator.sub.--1 prefixes text and a second operator labeled CapitalizeOperator.sub.--1 capitalizes text. Each has one input and one output. PrefixOperator.sub.--1.Outputs.Out.sub.--1 is linked to CapitalizeOperator.sub.--1.Inputs.Value.sub.--1. Here is the series of events that would occur from the instructions of FIG. 6 using the object model explained above: First, PrefixOperator.sub.--1.Inputs.Value.sub.--1.Value is set to "abc". Second, The PrefixOperator.sub.--1 is notified that all input values are present and the RunOperation( ) is called. During this operation "abc" is prefixed with "efg" to make "efgabc". Next, PrefixOperator.sub.--1.Outputs.Out.sub.--1.Value is set to "efgabc". Next, CapitalizeOperator.sub.--1.Inputs.Value.sub.--1.Value is set to "efgabc". Next, CapitalizeOperator.sub.--1 is notified that all input values are present and the RunOperation( ) is called. During this operation "efgabc" is changed to "EFGABC". Finally, CapitalizeOperator.sub.--1.Outputs.Out.sub.--1.Value is set to "EFGABC". Thus, two operators with different functionality can be used in series to modify the text in a very specific way.

Figure 9:
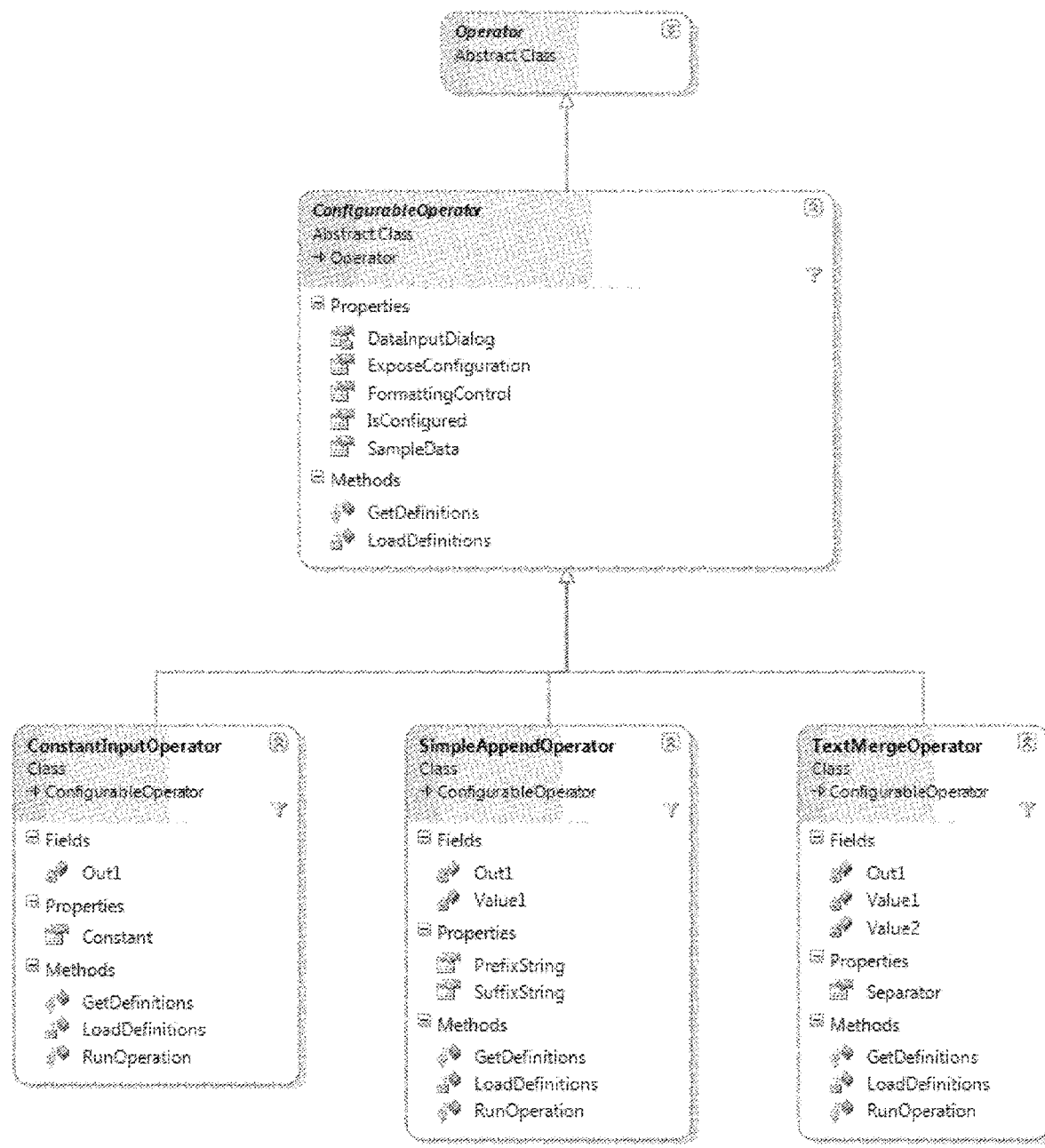
FIG. 9 illustrates the structure of a configurable operator in the exemplary rule-based structure consistent with the principles and teachings of the disclosure.

Continuing further in explanation of the Formatter components, configurable operators: For some operators there will need to be the ability for the user to change some of the functionality on the fly. Using the same example as above the prefix operator could be a configurable operator that would allow the user to specify the data to prefix the text with, such as in the example of FIG. 9. So rather than creating an operator for every possible text a user may want to use to prefix other text, one operator can be built that will expose the definition of the prefix text. This also allows the Formatter to implement the same operator but with different configurations that will meet the needs of the user. The configurable operator has to implement a configuration form that will display the exposed definitions of the operator. So, each operator implements a LoadDefinitions and GetDefinitions function that will set and get the definitions respectively for the operator. The definitions for the operator are saved to and retrieved from the MapDefinition file using XML or another scripting language.

Figures 10, 11:
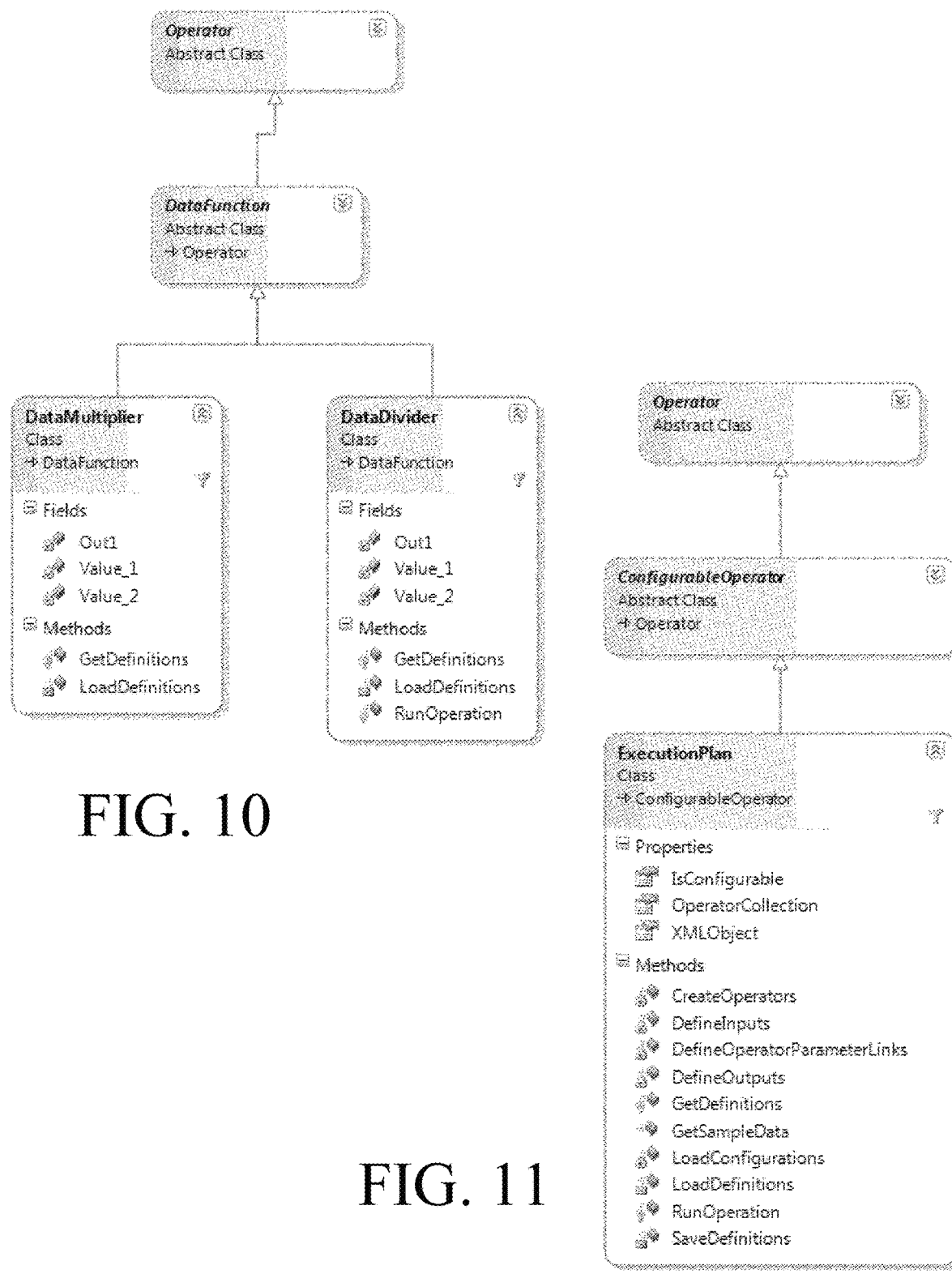
FIG. 10 shows the construction of a multiply and a divide operator in the exemplary rule-based structure consistent with the principles and teachings of the disclosure.
FIG. 11 illustrates the construction of an execution plan from a series of operators in the exemplary rule-based structure consistent with the principles and teachings of the disclosure.

Now referring to FIG. 11, when a series of operators are connected together to perform a specific function the series can be scripted and saved as an execution plan. An execution plan is an object that inherits from the operator class. An execution plan encapsulates a collection of operators that are connected in series. The execution plan will expose the non-linked input and output parameters of the enclosed operators. Since the execution plan object inherits from the operator class it can also be used within other execution plans. The ability for execution plans to consume other execution plans allows the Formatter to build basic execution plans that can then be used in building more complex execution plans. Execution plan definitions, in the exemplary syntax, are scripted using XML or another scripting language. When an execution plan is defined the child operators are referenced by their class names so that the operators can be created using reflection. Since the operators can be created using reflection new operators can be added to the Formatter and the types of operators do not need to be static or "hard coded". FIG. 23 provides an exemplary execution plan in the exemplary format.

Figures 14, 15:
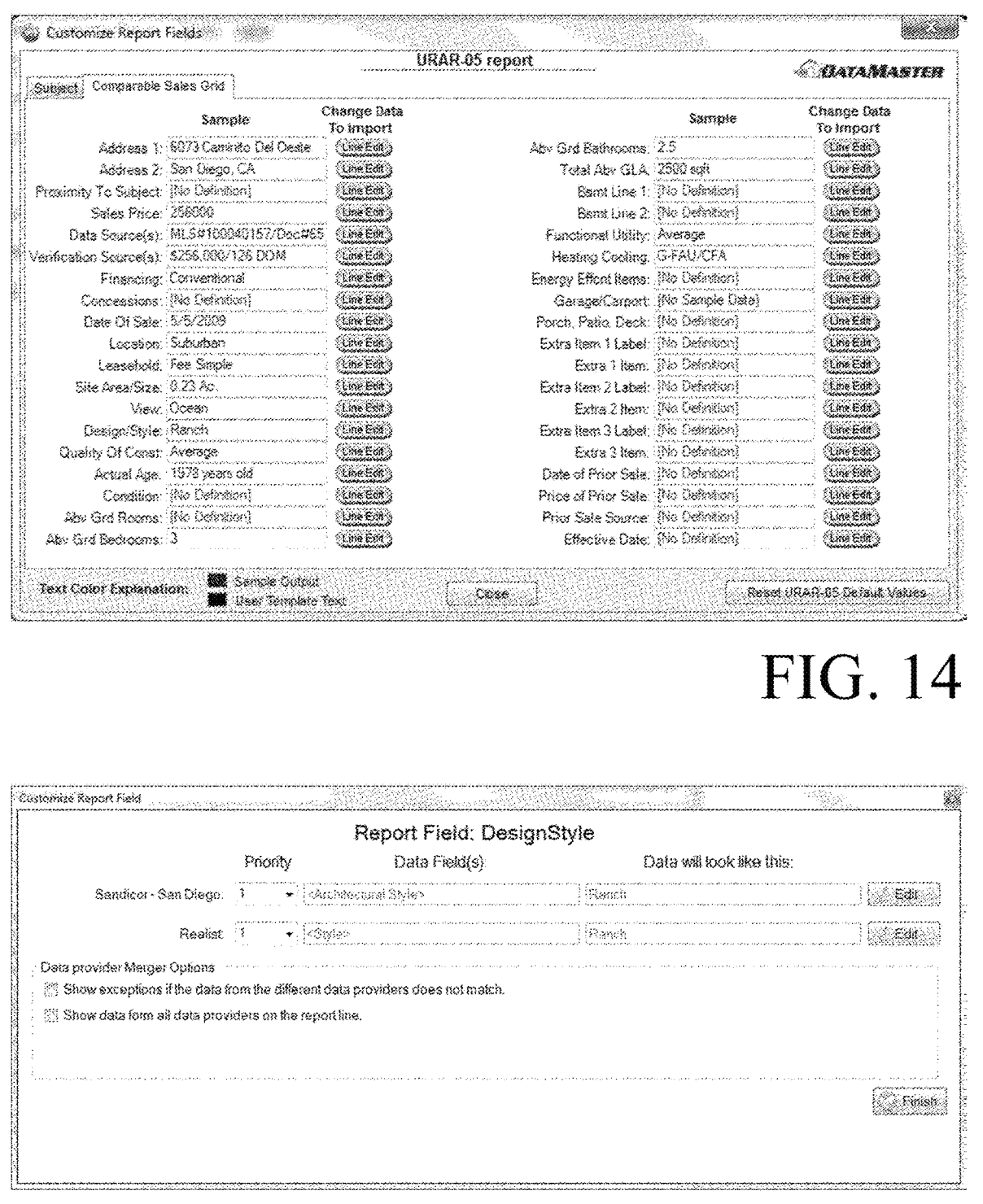

Screens within the exemplary Formatter are now shown and briefly explained. It is convenient that the Formatter, or other application that allows for the preparation of rules and map definitions, have a user interface such that it is not necessary to know the language used by the program, nor is it necessary to edit any files storing these rules or definitions. To that end, the exemplary Formatter has a windows-type interface through which the editing of these can be accomplished. Appearing in FIG. 14 is the main page for the "customize forms" section of the Formatter, showing the available report fields that data could be sent to, here in the "URAR-05" report. If the user wanted to define how the data should be sent they would click on the line edit button for that report line. Appearing at the bottom of the screen is a legend, declaring that sample data for a defined field appears in blue, fixed text in black, and undefined fields in red (as annotated by the [No Definition] text).

After clicking the Line Edit button the user will be presented with a window such as that shown in FIG. 15 which shows a line for each data provider that is supported for the user. The user can prioritize the data they want to use using the priority selection drop down boxes. To edit how data is read from a particular data provider the user can click the Edit button. When they are finished they can click the Finish button. Appearing in FIG. 16 is an XML sample of an execution plan that would be created using data from two data providers of FIG. 15, from the report of FIG. 14.

FIG. 17 shows the window detail when an edit button within FIG. 16 is clicked. This screen shows the user all of the available data elements for a particular data provider. Here, the program also allows the user to search through the data elements by keyword or class, in the event there are a large number to choose from. Once the desired data element is found the user can move it into the data section using the arrows. In the data element section the user can customize the specific element by clicking the Edit button of the data element, and upon doing so the user would be presented with a screen as that shown in FIG. 18, the resulting XML definition for that definition shown in FIG. 19.

Figure 20:
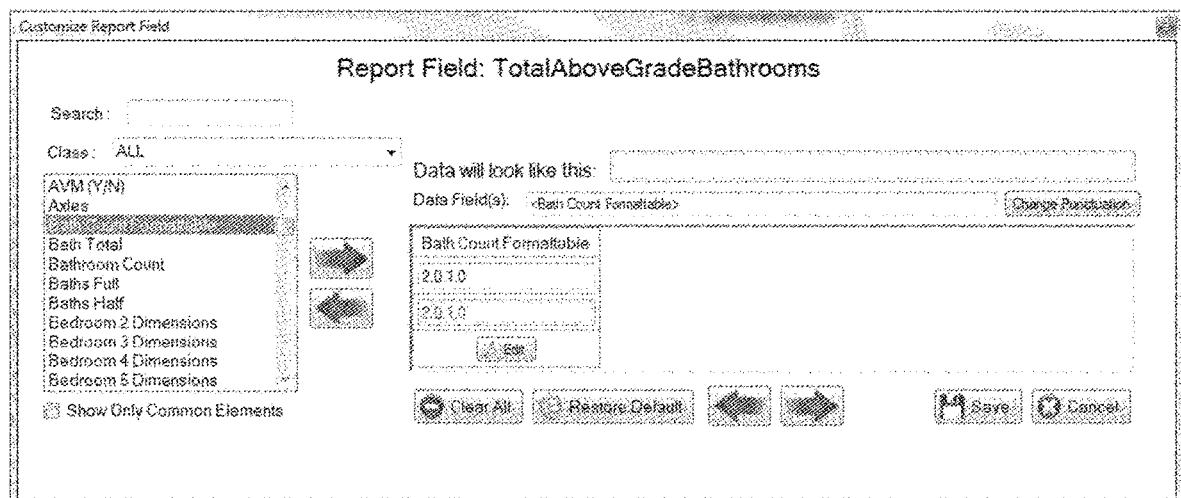
FIG. 20 shows another sample screen in the exemplary Formatter for customization of a field in a final report including a custom tag, which tag is usable as information as if it came from a data source consistent with the principles and teachings of the disclosure.
Figure 22:
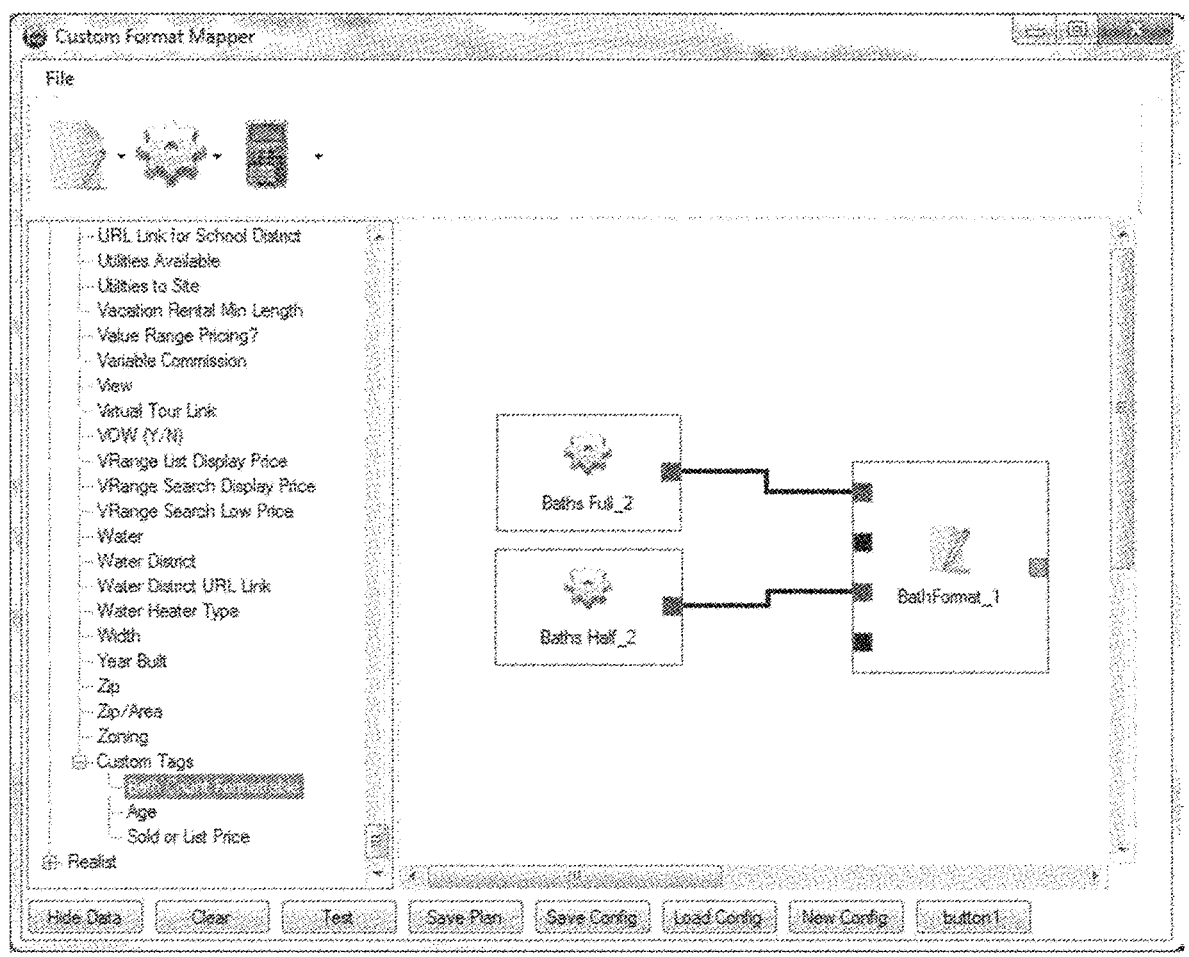
FIG. 22 shows an exemplary screen of a custom format mapper containing a graphical hierarchical representation of a custom tag consistent with the principles and teachings of the disclosure.

Now referring to FIG. 20, users can also use "Custom Tags" that have been pre-built for specific functionality. When these are added they are saved as a nested execution plan within the execution plan as shown in the XML definition of FIG. 21. FIG. 22 shows another window showing the designer for the Custom Tag "BathCountFormattable" as defined in the text of FIG. 21.

Now although certain systems, products, components, functions and methods have been described above in detail, one of ordinary skill in the art will recognize that these functions and methods are adaptable to other systems and products that process data in real-estate environments and beyond. Likewise, although the described functions have been described through the use of block diagrams, flowcharts, software and hardware descriptions, one of ordinary skill in the art will recognize that most of the functions described herein may be implemented in software or hardware. The exact configurations described herein need not be adhered to, but rather the diagrams and architectures described herein may be varied according to the skill of one of ordinary skill in the art. Therefore, the inventions disclosed herein are to be fully embraced within the scope as defined in the claims. It is furthermore understood that the summary description and the abstract are provided merely for indexing and searching purposes, and do not limit the inventions presented herein in any way.

As discussed above FIG. 23 illustrates an exemplary implementation of an execution plan in the exemplary format.

Figure 24:
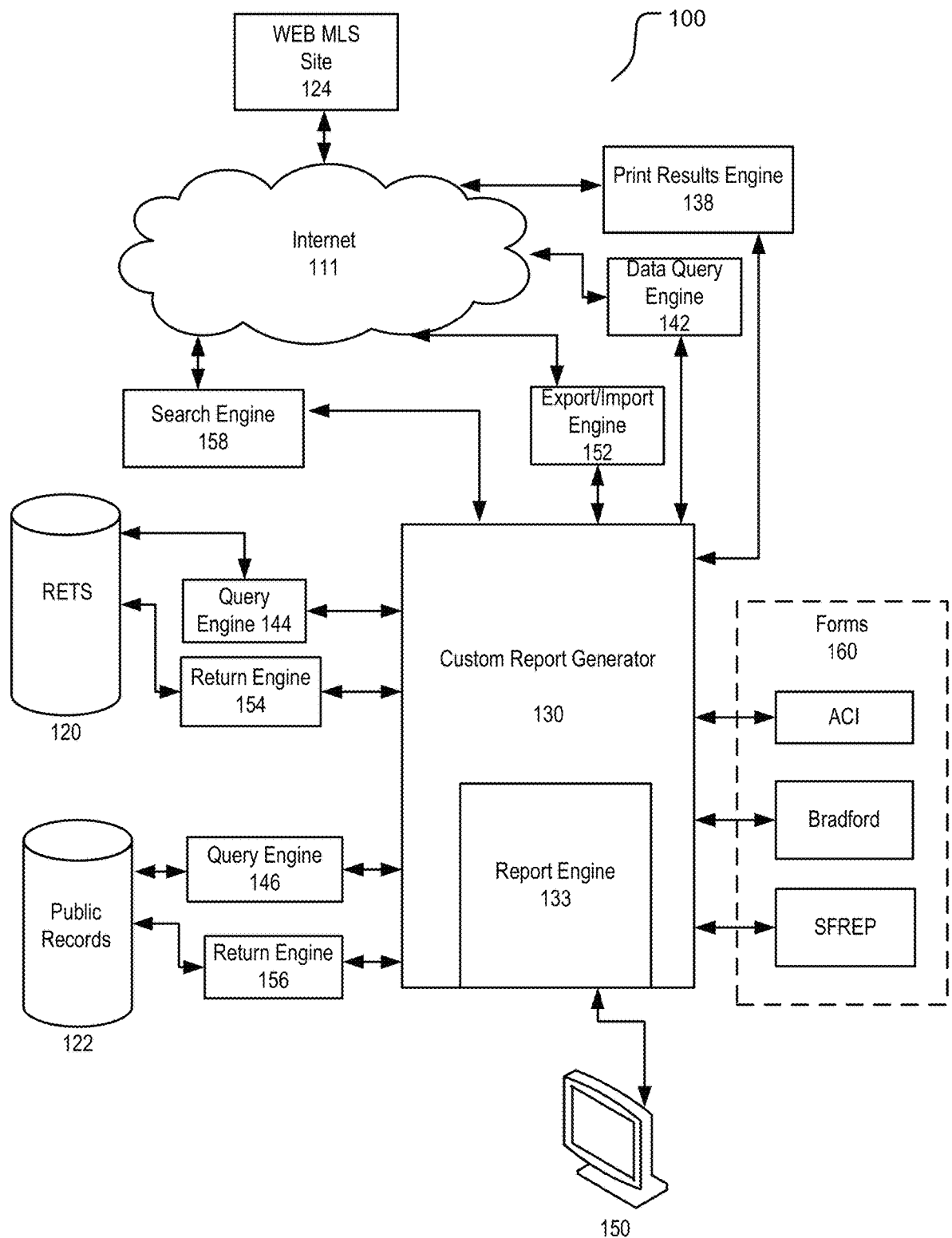
FIG. 24 illustrates an exemplary computing environment within which the methods and systems disclosed herein may be implemented consistent with the principles and teachings of the disclosure.

FIG. 24 illustrates an exemplary computing environment within which the methods and systems disclosed herein may be implemented. As can be seen in the figure, computing environment 100 may comprise computing components distributed across a network such as the internet 111. A plurality of real property databases may be connected to, and accessible from, the internet 111. For example, the RETS database 120 may comprise and offer electronic data records representing sales and listing histories for a plurality or real properties that may be represented in computer records by their characteristics. Another database source for real property records may be any public records database 122 that contains publically available electronic records. An additional source for property data records may be an MLS web site that is accessible from the internet 111.

In an implementation, a custom report generator 130 may comprise hardware and software components such as data query engines 142, 144, and 146 for making queries to the databases of the MLS website 124, RETS database 120, and public records database 122 respectively. In an implementation, queries may be entered by a user at a computer terminal 150 where the custom report generator 130 may be installed or accessed. The custom report generator 130 may formulate the queries entered by the user via a report engine 133. For example, in an implementation, the report engine 133 may receive the user query and automatically select a database to query. Additionally, the user may be able to manually select a database through the custom report generator product.

In an implementation, the report engine 133 may format the query in order to comport with the requirements of the database that has been selected. Additionally, the custom report generator 130 may comprise return engines 154 and 156 for receiving the data resulting from the queries from the various databases. The custom report generator 130 may comprise an export/import engine 152 for receiving and formatting the results of the queries from the databases. In an implementation, the export import engine 152 may standardize and/or normalize the query results.

In an implementation, the custom report generator 130 may comprise a print result engine 138 for outputting reports onto the internet 111 or to the user computer terminal 150.

In an implementation, the custom report generator 130 may comprise a forms database 160 that is stored in computer memory or storage. The forms database 160 may comprise forms for standard reports, or saved report styles that were previously customized by a user. For example, standard report forms may be for: ACI, Bradford, and SF REP, to name only a few. It is intended that any desired form that is repeatable and deals with real property records falls within the scope of this disclosure, in so much that they can be stored in computer memory and recalled and populated with query results.

Additionally, an implementation of the custom report generator 130 may comprise a search engine 158 that is configured to initiate searches within the computing environment 100 and on the internet 111.

Figure 25:
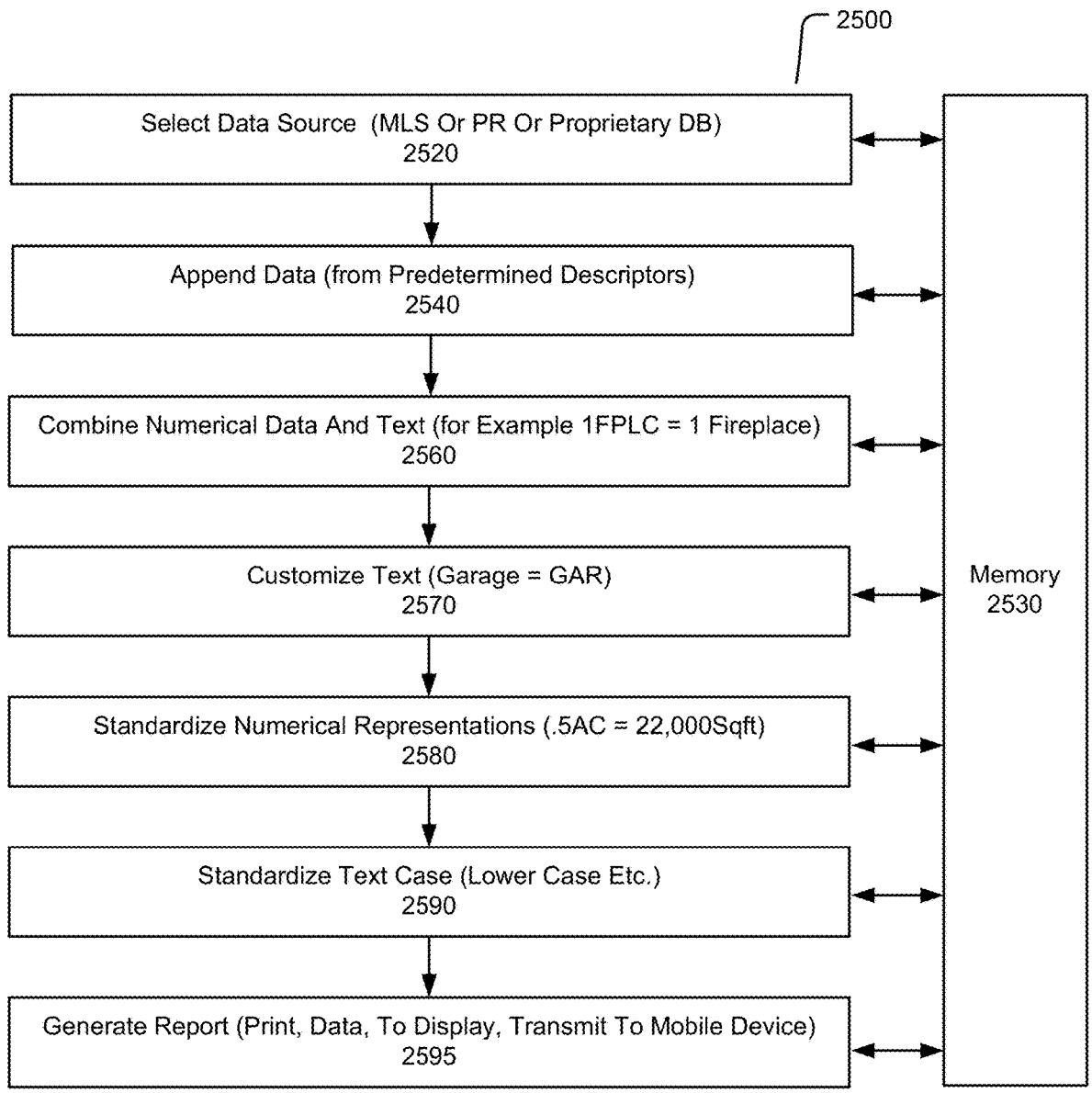
FIG. 25 illustrates an implementation of a method for generating a custom report and/or profile from a plurality of real property record databases consistent with the principles and teachings of the disclosure.

FIG. 25 illustrates an implementation of a method for generating a custom report from a plurality of real property record databases. Custom report method 2500 may comprise computer readable instructions that cause computer hardware and firmware to perform the processes of: at 2520 receiving a selection from a user for a database source of real properties represented by data records. As discussed above, the user may manually select the desired database to be the source of the property records. Additionally, this process may be automatically performed by the computing system as part of a prior saved report form.

At 2530, the process may comprise retrieving from computer memory predetermined descriptors corresponding to data values within the data records in order to comport to a form or format that will organize data record values in a customized report. In an alternate implementation, a user may enter descriptors on the fly in real time to further customize the report.

At 2540, the computing environment may append the data values within the corresponding retrieved descriptors in order to continue in generating the custom report.

At 2560, the process of combining numerical data derived from the data values with text data to represent a characteristic of the real properties contained within the data records may be performed. For example, the data record may comprise the phrase "1FPLC," which may be an undesired representation of a property having a single fireplace. Accordingly, the user may desire that the numerical data and text read together as "1 Fireplace" instead of "1FPLC."

At 2570, the method may customize the combined numerical data and text data to create a customized property characteristic and store the customized property characteristic in computer memory at 2530. In other words, the method will allow for further customization that may then be stored in memory for later use.

At 2580, the computer system may retrieve the customized property characteristic from memory and then standardize the numerical data of the customized property characteristic. In other words, the numerical data may comprise less desirable units of measure which can then be converted to more desirable units of measure. For example, 0.5 Acers=22,000 square feet.

Likewise, at 2590 the computer system may standardize the text data of the customized property characteristic and store the standardized property characteristic in computer memory at 2530. For example, the user may desire all capital letters, camel case, sentence case, etc.

At 2595, the system may then generate a customized report that comprises the standardized property characteristics with the corresponding predetermined descriptors that may be retrieved from memory after being standardized and customized by the user. Once the report is generated it may be output to a printer, digital device, mobile device, etc.

Figure 26:
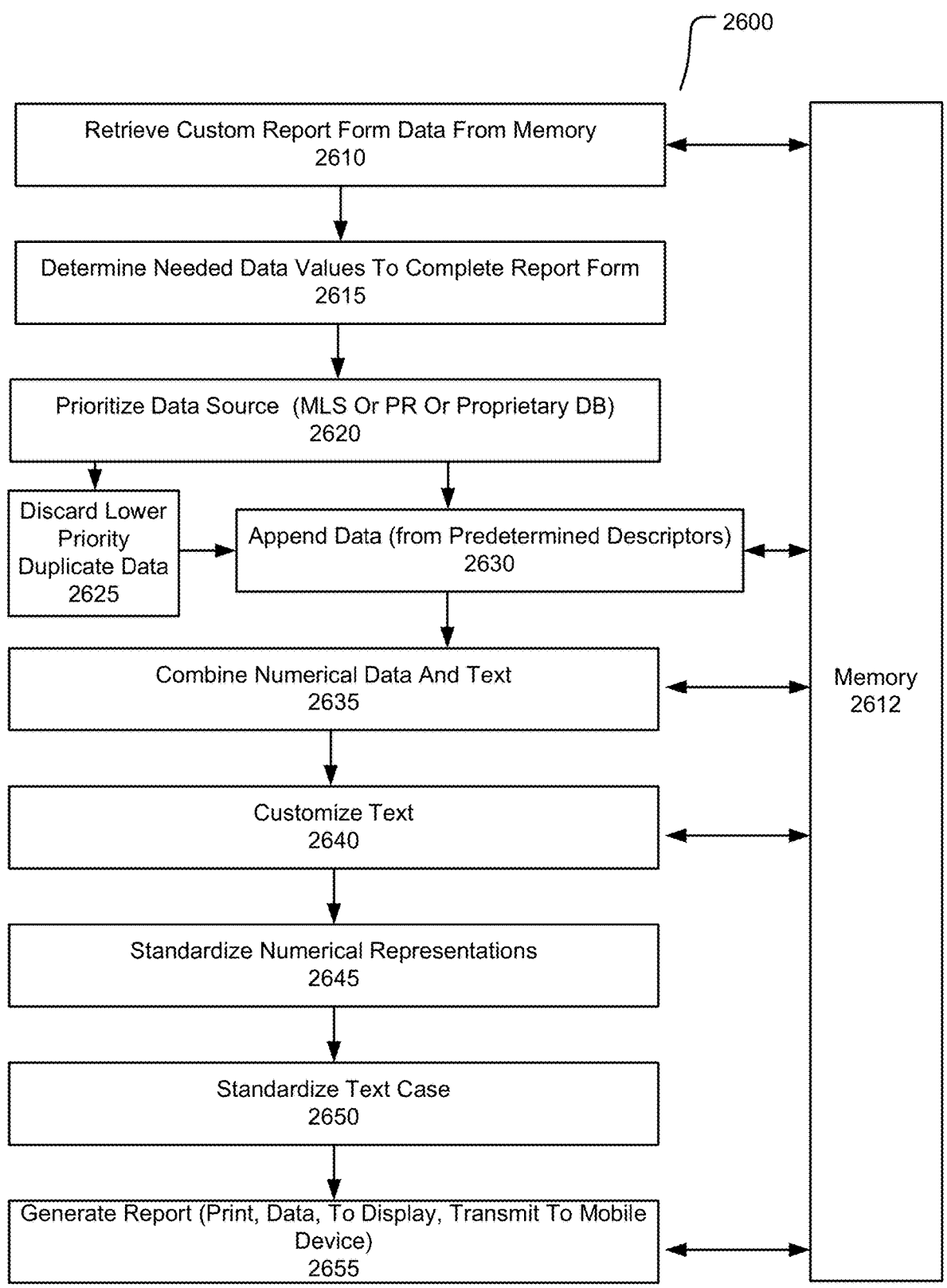
FIG. 26 illustrates an implementation of a method for generating a custom report and/or profile of real property characteristics within a computing environment consistent with the principles and teachings of the disclosure.

FIG. 26 illustrates a method for generating a custom report of real property characteristics within a computing environment. The method 2600 may cause computer hardware and software to perform the process of retrieving custom report form data at 2610 from memory at 2612. The custom report for data may be from a prior made form or from a third party that has dictated the desired form and/or format of the form. This may be for ease in processing or other requirements from a certain third party, such as Freddie Mac or Fannie Mae or some other third party.

At 2615, the system may determine the data values needed in order to populate the retrieved form.

In an implementation, the database sources may be prioritized at 2620. The prioritization may be done manually by a user, or may be automatically selected by the computer based on the determined needed values from processes at 2615.

In an implementation, a plurality of database sources may be selected and may provide duplicate data values. At 2625, the lower priority duplicate data values may be discarded. Additionally, predetermined descriptors may be retrieved from memory 2612 that correspond to data values within the data.

At 2630, the computing environment may append the data values with the corresponding retrieved descriptors in order to continue in generating the custom report.

At 2635, the process of combining numerical data, which may be derived from the data values with text data to represent a characteristic of the real properties contained within the data records, may be performed. As discussed above, the data record may comprise, for example, the phrase "1FPLC," which may be an undesired representation of a property having a single fireplace. Accordingly, the user may desire that the numerical data and text read together as "1 Fireplace."

At 2640, the method may customize the combined numerical data and text data to create a customized property characteristic and store the customized property characteristic in computer memory. In other words, the method will allow for further customization that may then be stored in memory for later use.

At 2645, the computer system may retrieve the customized property characteristic from memory and then standardize the numerical data of the customized property characteristic. In other words, the numerical data may comprise less desirable units of measure, which can then be converted to more desirable units of measure. For example, 0.5 Acers=22,000 square feet.

Likewise, at 2650 the computer system may standardize the text data of the customized property characteristic and store the standardized property characteristic in computer memory. For example, the user may desire all capital letters, camel case, sentence case, etc.

At 2655, the system may then generate a customized report that comprises the standardized property characteristics with the corresponding predetermined descriptors that may be retrieved from memory after being standardized and customized by the user. Once the report is generated it may be output to a printer, digital device, mobile device, etc.

Figure 27:
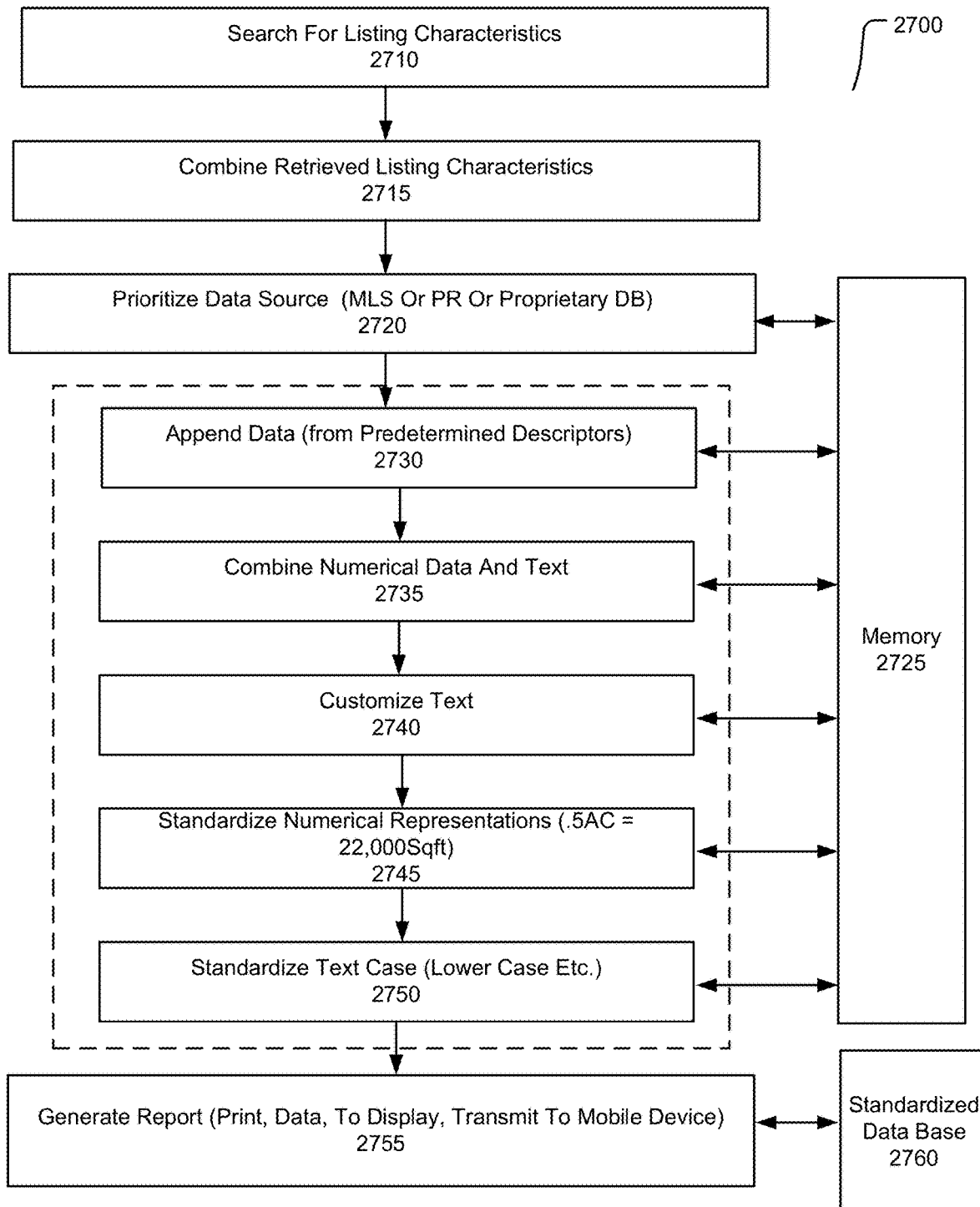
FIG. 27 illustrates an implementation of a method for generating a custom report and/or profile from aggregated data from a plurality of database sources where no selection of a single database source is made in accordance with the principles and teachings of the disclosure.

FIG. 27 illustrates a method for generating a custom report from aggregated data from a plurality of database sources where no selection of a single database source is made. At 2710, a search for listing characteristics may be performed in order to find desirable real properties that are represented by data records in an aggregated database. The search may be performed by a search engine configured to search the database and/or the internet.

The results of the search may be returned to the report generator and may be combined at 2715 and then stored in memory at 2725.

In an implementation, database sources may be prioritized at 2720. The prioritization may be done manually by a user, or may be automatically selected by the computer based on search performed at 2710.

In an implementation, when a plurality of database sources are used, they may provide duplicate data values. The lower priority duplicate data values may be discarded. Additionally, predetermined descriptors may be retrieved from memory 2730 that correspond to data values within the data records.

At 2730, the computing environment may append the data values with the corresponding retrieved descriptors in order to continue in generating the custom report.

At 2735, the process of combining numerical data derived from the data values with text data to represent a characteristic of the real properties contained within the data records may be performed. As discussed above, the data record may comprise the phrase "1FPLC," which may be an undesired representation of a property having a single fireplace. Accordingly, the user may desire that the numerical data and text read together as "1 Fireplace."

At 2740, the method may customize the combined numerical data and text data to create a customized property characteristic and store the customized property characteristic in computer memory. In other words, the method will allow for further customization that may then be stored in memory for later use, such as in a form database at 2760.

At 2745, the computer system may retrieve the customized property characteristic from memory and then standardize the numerical data of the customized property characteristic. In other words, the numerical data may comprise less desirable units of measure which can then be converted to more desirable units of measure. As discussed above, 0.5 Acers=22,000 square feet.

Likewise, at 2750 the computer system may standardize the text data of the customized property characteristic and store the standardized property characteristic in computer memory. For example, the user may desire all capital letters, camel case, sentence case, etc.

At 2755, the system may then generate a customized report that comprises the standardized property characteristics with the corresponding predetermined descriptors that may be retrieved from memory after being standardized and customized by the user. Once the report is generated it may be output to a printer, digital device, mobile device, etc.

Additionally, a standardized form database may be created at 2760 that comprises prior made: custom forms, partially completed, or entirely populated forms. Such a form database would greatly ease the effort associated with commonly repeated forms created by a user. Accordingly, FIG. 28 illustrates the method 2700 with the additional process of generating a second report at 2765 that is based on a standardized form retrieved from the standard form database at 2760.

Figure 28:
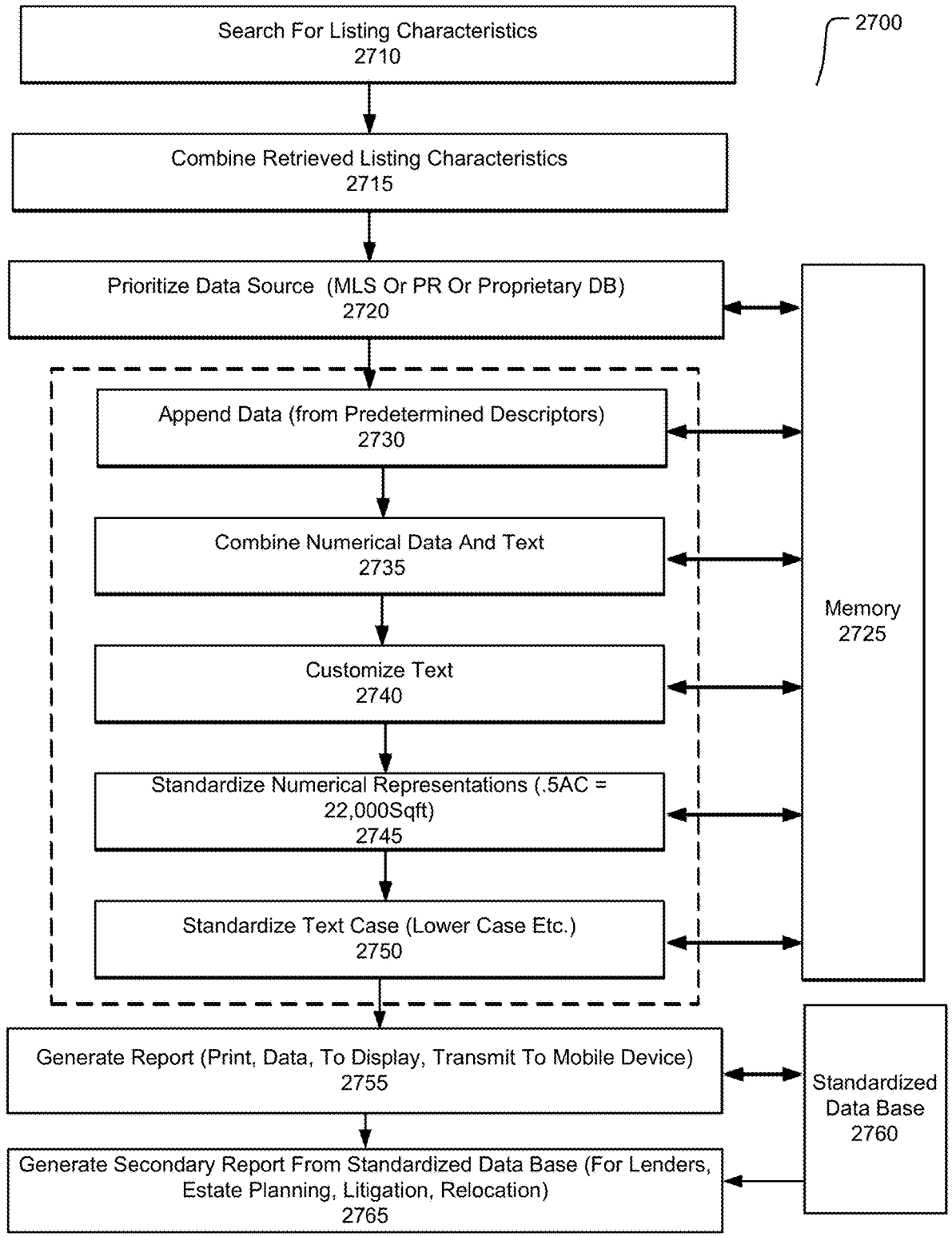
FIG. 28 illustrates an implementation of a method with the additional process of generating a secondary report and/or profile that is based a standardized form retrieved from the standard form database consistent with the principles and teachings of the disclosure.
Figure 29:
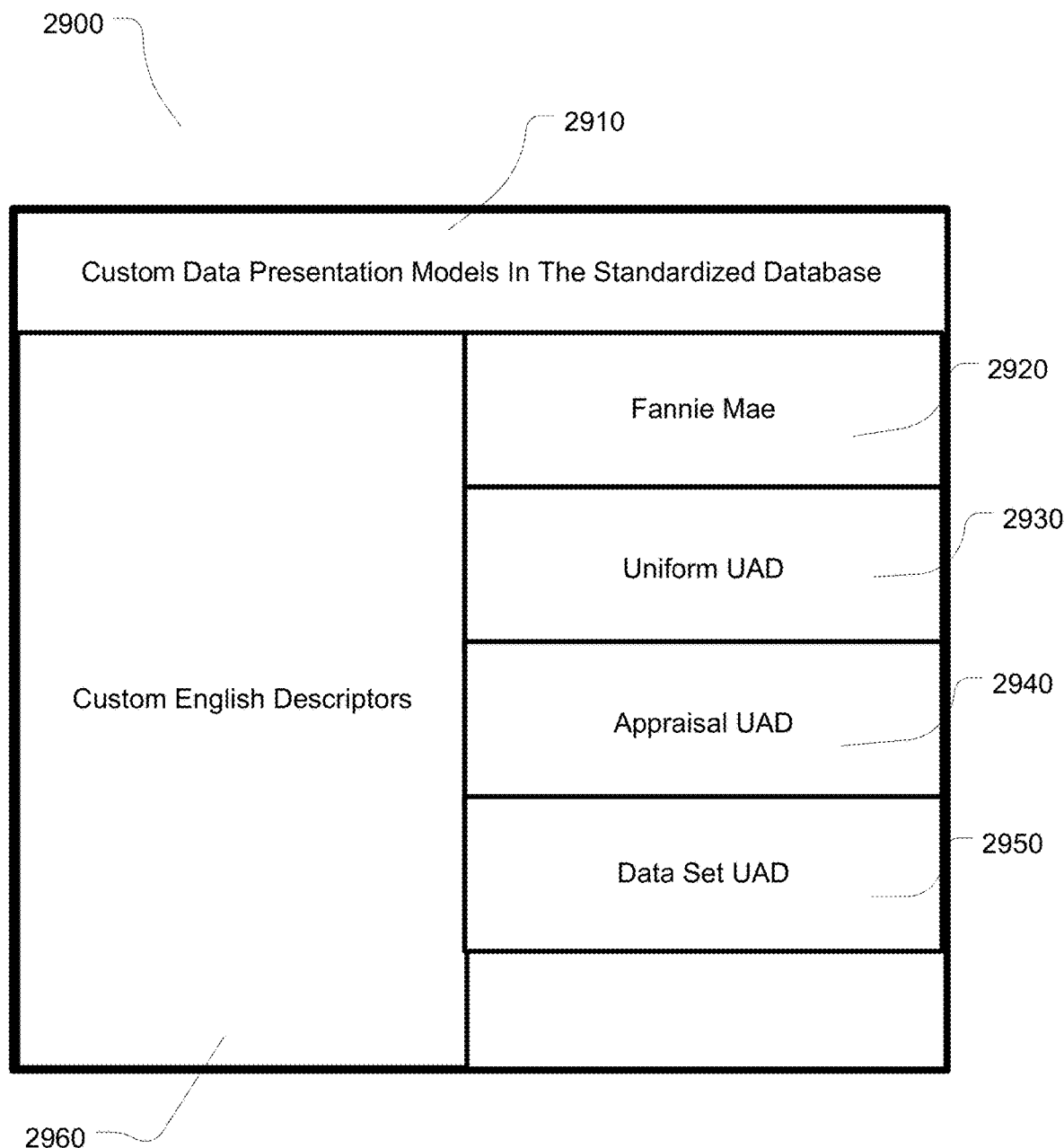
FIG. 29 illustrates a hardware schematic of the standard form database created by the disclosed methods and systems consistent with the principles and teachings of the disclosure.

FIG. 29 illustrates a hardware schematic of the standard form database created by process 2760 of method 2700 illustrated in FIG. 28. As shown in the figure, the standard form database 2900 may comprise metadata 2910 that identifies the contents of the database and ranges of data values. Additionally, database 2900 may comprise form data dedicated to specific third parties. For example, there may be Fannie Mae data 2920, Uniform UAD data 2930, Appraisal UAD data 2940 and Data Set UAD 2950, to name a few. Additionally, other major and minor formats may be: Wells Fargo Data Format; Relocation Appraisal Data Format; Litigation Appraisal Data Format.

An embodiment of a database 2900 may also comprise custom English descriptors 2960 that have been previously entered by the user. Custom descriptors may be appended to any data values that have been retrieved and generated in order to make a report more readable and user friendly.

Figure 30:
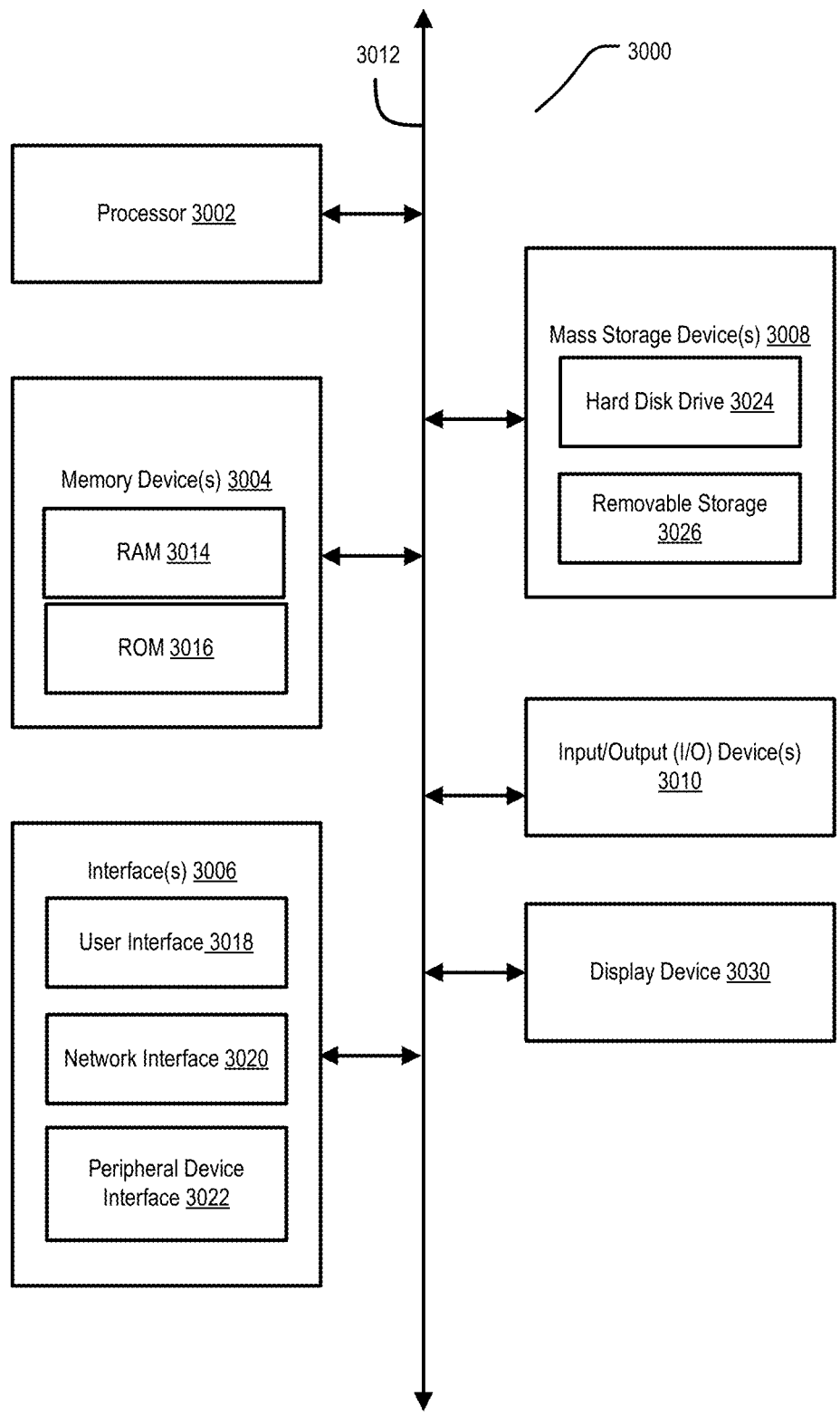
FIG. 30 illustrates a block diagram depicting an example computing device consistent with the principles and teachings of the disclosure.

FIG. 30 is a block diagram depicting an example computing device 3000. In some embodiments, computing device 3000 is used to implement one or more of the systems and components discussed herein. For example, computing device 3000 may allow a user or administrator to access resource manager. Further, computing device 3000 may interact with any of the systems and components described herein. Accordingly, computing device 3000 may be used to perform various procedures and tasks, such as those discussed herein. Computing device 3000 can function as a server, a client or any other computing entity. Computing device 3000 can be any of a wide variety of computing devices, such as a desktop computer, a notebook computer, a server computer, a handheld computer, a tablet, and the like.

Computing device 3000 includes one or more processor(s) 3002, one or more memory device(s) 3004, one or more interface(s) 3006, one or more mass storage device(s) 3008, and one or more Input/Output (I/O) device(s) 3010, all of which are coupled to a bus 3012. Processor(s) 3002 include one or more processors or controllers that execute instructions stored in memory device(s) 3004 and/or mass storage device(s) 3008. Processor(s) 3002 may also include various types of computer-readable media, such as cache memory.

Memory device(s) 3004 include various computer-readable media, such as volatile memory (e.g., random access memory (RAM)) and/or nonvolatile memory (e.g., read-only memory (ROM)). Memory device(s) 3004 may also include rewritable ROM, such as Flash memory.

Mass storage device(s) 3008 include various computer readable media, such as magnetic tapes, magnetic disks, optical disks, solid state memory (e.g., Flash memory), and so forth. Various drives may also be included in mass storage device(s) 3008 to enable reading from and/or writing to the various computer readable media. Mass storage device(s) 3008 include removable media and/or non-removable media.

I/O device(s) 3010 include various devices that allow data and/or other information to be input to or retrieved from computing device 3000. Example I/O device(s) 3010 include cursor control devices, keyboards, keypads, microphones, monitors or other display devices, speakers, printers, network interface cards, modems, and the like.

Interface(s) 3006 include various interfaces that allow computing device 600 to interact with other systems, devices, or computing environments. Example interface(s) 606 include any number of different network interfaces, such as interfaces to local area networks (LANs), wide area networks (WANs), wireless networks, and the Internet.

Bus 3012 allows processor(s) 3002, memory device(s) 3004, interface(s) 3006, mass storage device(s) 3008, and I/O device(s) 3010 to communicate with one another, as well as other devices or components coupled to bus 3012. Bus 3012 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 3000, and are executed by processor(s) 3002. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 31:
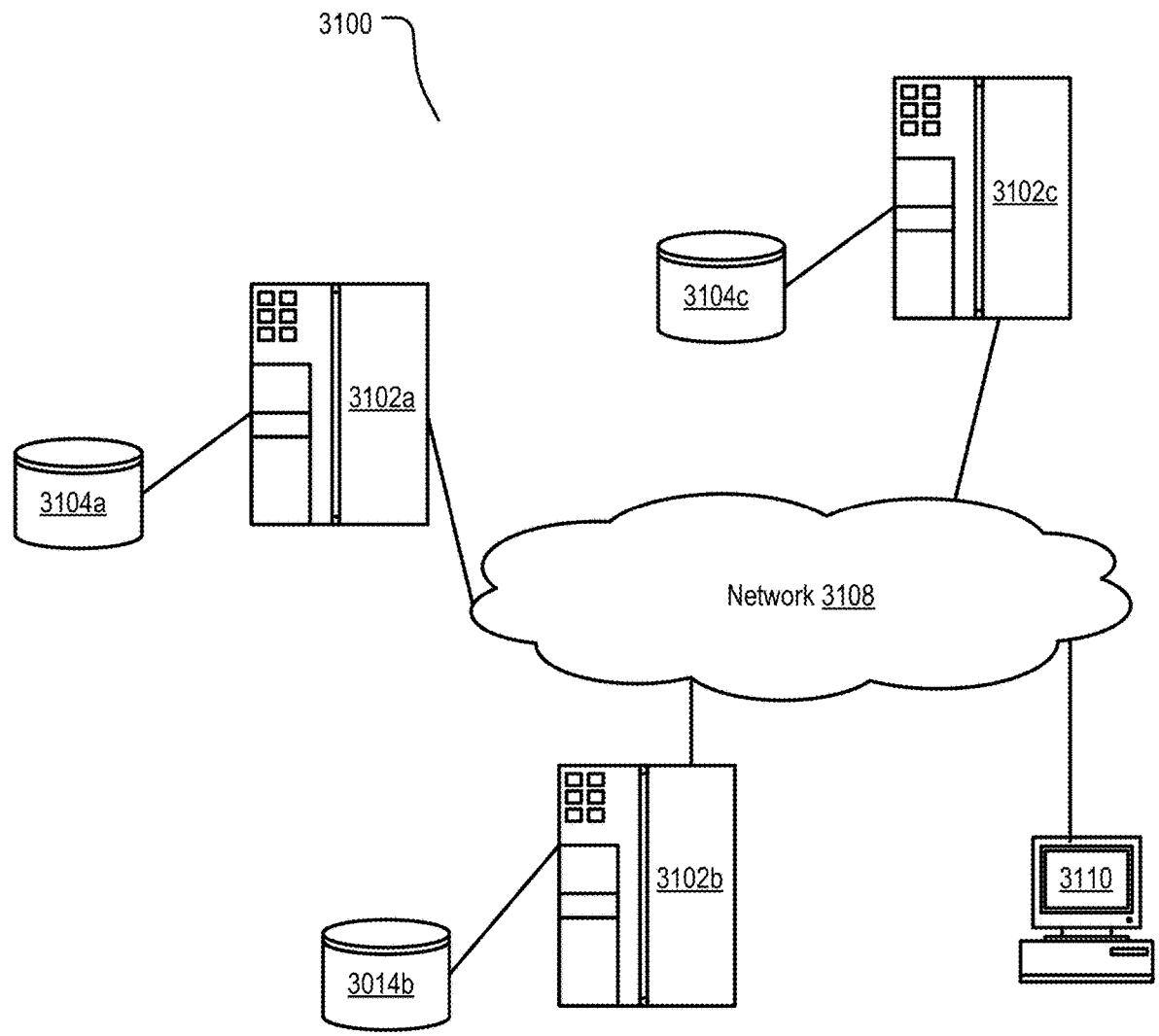
FIG. 31 illustrates a computing environment for performing the processes and methods disclosed herein.

FIG. 31 illustrates a computing environment for performing the processes and teachings disclosed herein. As illustrated, a system may comprise a user terminal 3110 for receiving user inputs. The system may further comprise a report generator server 3102*b* having a report generator database 3014*b* connected thereto. The system may further comprise third party data servers 3102*a* and 3102*c* having corresponding databases 3104*a* and 3104*c*, respectively. An implementation of a computer system comprising processors and computer memory for generating custom real estate reports over a computer network 3108 may comprise a user terminal 3110 for receiving a selection from a user for a database source of real properties represented by data records, predetermined descriptors corresponding to data values within the data records stored in computer memory, appended data values with the corresponding retrieved descriptors, combined numerical data derived from the data values with text data to represent a characteristic of the real properties contained within the data records, a customized property characteristic created by combining numerical data and text data and stored in computer memory, standardized numerical data which is the customized property characteristic retrieved from memory and then standardized, standardized text data which is the text data of the customized property characteristic retrieved from computer memory, and a customized report that comprises the standardized property characteristics with the corresponding predetermined descriptors. The system may further comprise retrieved data records from a plurality of database sources 3102*a* and 3102*c*, and a prioritized plurality of database sources. Additionally, the system may further comprise preference data regarding the database sources wherein the database sources are prioritized based on different property characteristics from within the data records.

An implementation of the system may further comprise a selection interface comprising numerical data formats, text data formats and/or English descriptors represented within the data records.

Figure 32:
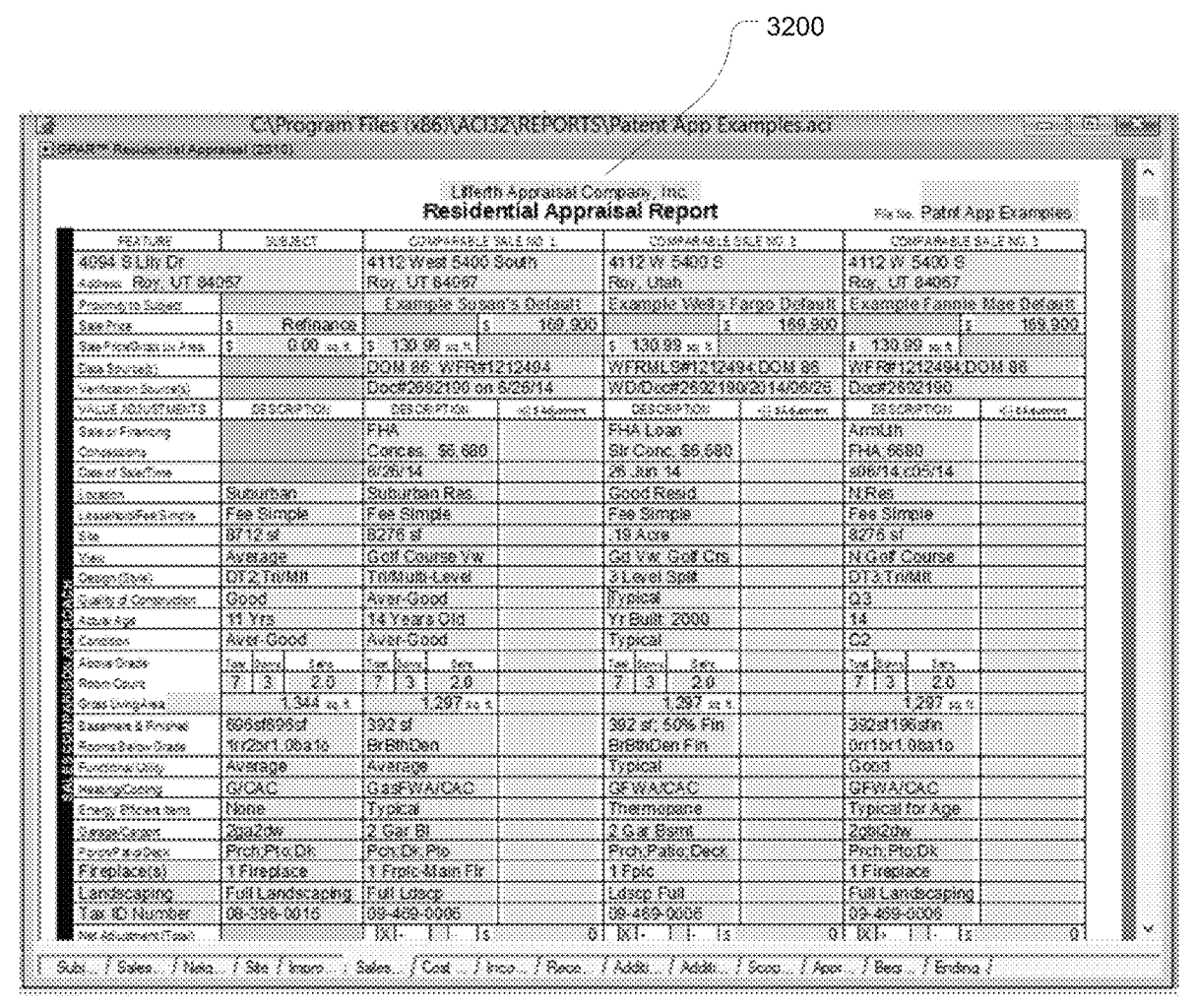

FIG. 32 illustrates an embodiment of how the same data can be formatted differently in a custom form report 3200 in accordance with the disclosed teachings and methods. FIG. 32 shows how the same data can be customized by the end user in at least 3 different ways. It will be appreciated that there is an unlimited number of ways the data can be formatted.

In an implementation a portion of a typical residential appraisal report form is illustrated. Specifically, the portion illustrated is the "Sales Comparison Grid" of the report. As noted, there is a column for the "Subject Property" on the left and 3 columns for 3 "Comparable Sale" properties to the right of the Subject Property. For demonstration purposes, the form illustrates:

1. The property being appraised (Subject Property) is described in the left column. (Address is 4092 S Lily Dr, Roy, Utah 84067).
2. In a normal appraisal, there may be 3 properties listed on the report as comparable properties that have recently been sold. (COMPARABLE SALE NO's 1, 2 and 3).
3. For this example, the report generator has used the same property 3 times. Each example has a different set of defaults that describe the same property differently. For example, on the address line, note that the same address may be identified as follows:
   a. Comparable Sale No. 1 is described as: 4112 West 5400 South
   b. Comparable Sale No. 2 is described as: 4112 W 5400 S In the illustration above, the data may be the same data, but it may be formatted differently by the system and/or by the user. The individual end user may define these formats in the settings in the custom report generator once, and then all addresses will be formatted the same on all subsequent uses. It will be noted that each individual line below the address has essentially the same information presented differently as dictated by three (3) distinct end users according to their individual style, or perhaps as dictated by the end user's client (such as a Lender etc.).

FIG. 33 illustrates how the data may be used in an appraisal 3300 as generated by the custom report engine. Illustrated in the figure is an example of an actual appraisal of a property in Ogden, Utah. The format utilized in this case is the Fannie Mae mandated format formally known as UAD (Uniform Appraisal Dataset). Fannie Mae mandates that the data format be precise. This includes alpha, numeric and punctuation characters. The data in each line is formatted identically even though the actual data on each line may vary. In the present example, the following may be noticed:

1. How all the addresses are formatted the same even though there are 3 different properties.
2. How on the "Concessions" line, the type of financing is shown along with the amount of "Seller Concessions" in each case. The formatting is consistent but the data specific to each property is pulled from the database and placed in the property place and in the proper format.
3. How the Design (Style) line show the Subject Property and Comparable Sales 1 and 3 having the same description while Comparable 2 has a different design. Again, the formatting is identical.

Figure 34:
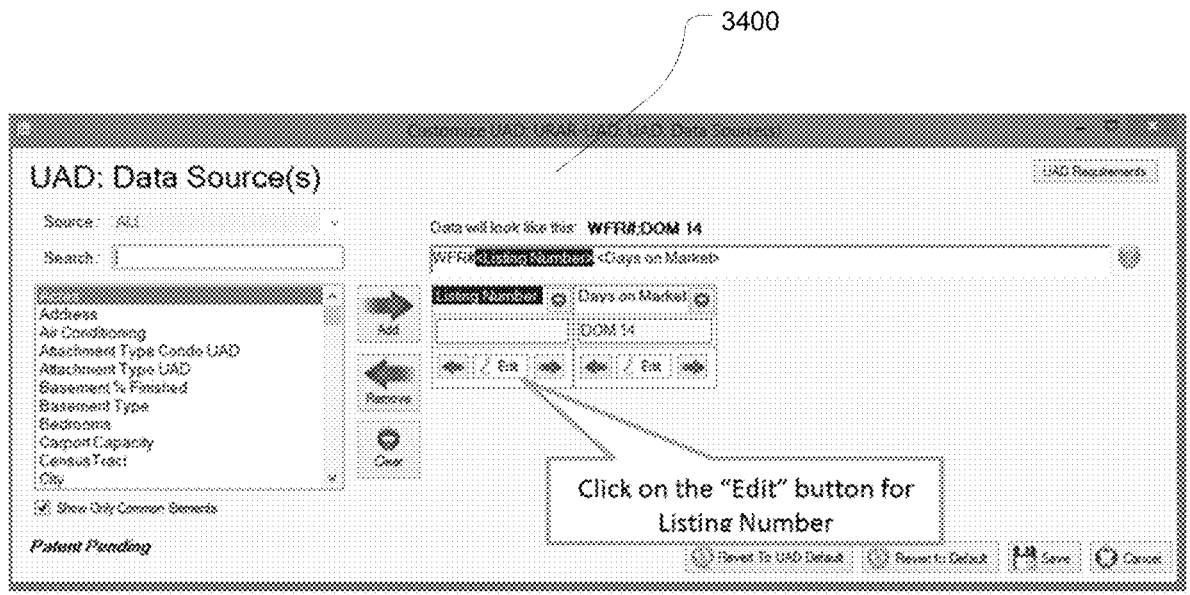
FIG. 34 illustrates an implementation of formatting a custom report using the disclosed methods and systems and in accordance with the principles and teachings of the disclosure.

FIG. 34 illustrates an implementation 3400 of formatting a custom report using the disclosed methods and systems herein. It will be noted that different formatting functions may be combined and each function can be accumulated on top of each other for each data box. These functions may comprise the following.

a. Alpha characters
b. Numeric Characters
c. Punctuation Characters
d. Manage Case Sensitivity (ALL CAPS; Camel Caps; all lower case; Capitalize the first word only etc)
e. Adding Text before a number
f. Adding Text after a number
g. Text Replacement
h. Selection of single, multiple or all potential data points within a data box.
i. Manage Units of comparison (8,276 square feet or 0.19 Acres)
j. Prioritize Data Sources (Example; MLS data or Public Records data)

Figure 35:
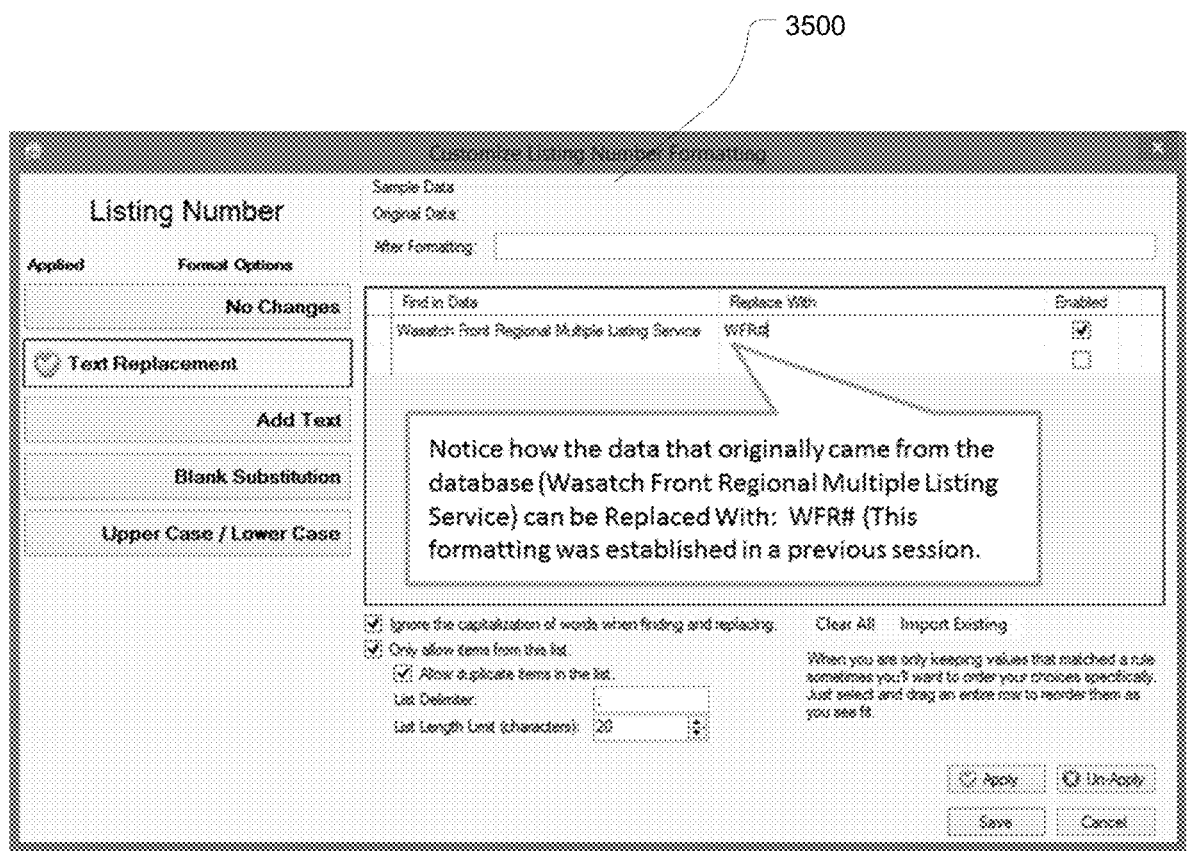
FIG. 35 illustrates an implementation of a formatting screen that will be displayed to the user in accordance with the principles and teachings of the disclosure.
Figure 36:
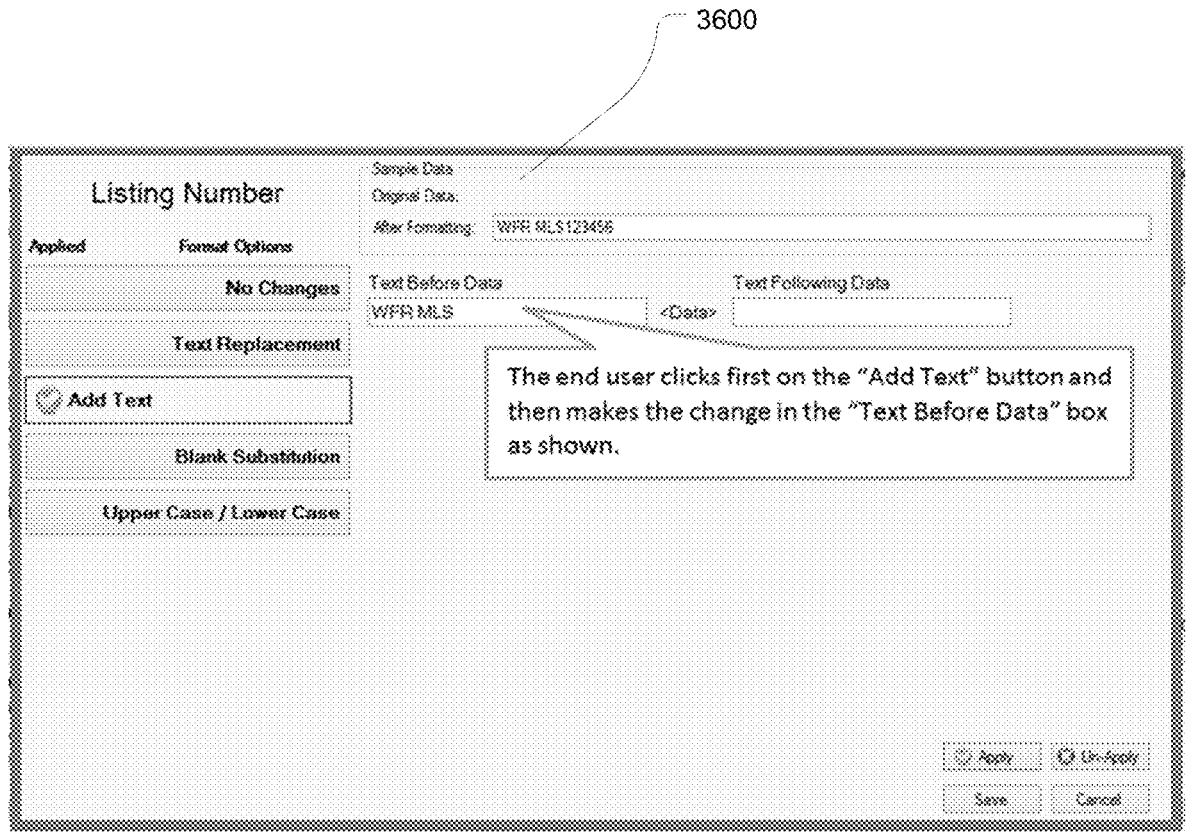
FIG. 36 illustrates the ability for a user to change the formatting of a custom report in accordance with the principles and teachings of the disclosure.

If a user desires to change the descriptive Name of the MLS that provided the MLS data, it would go to the UAD: Data Source(s) tag. FIG. 35 illustrates the formatting screen 3500 that will be displayed to the user. FIG. 36 illustrates that a user may change the formatting by selecting or clicking on the "Add Text" button and type in the changes to the formatting screen 3600.

Figure 37:
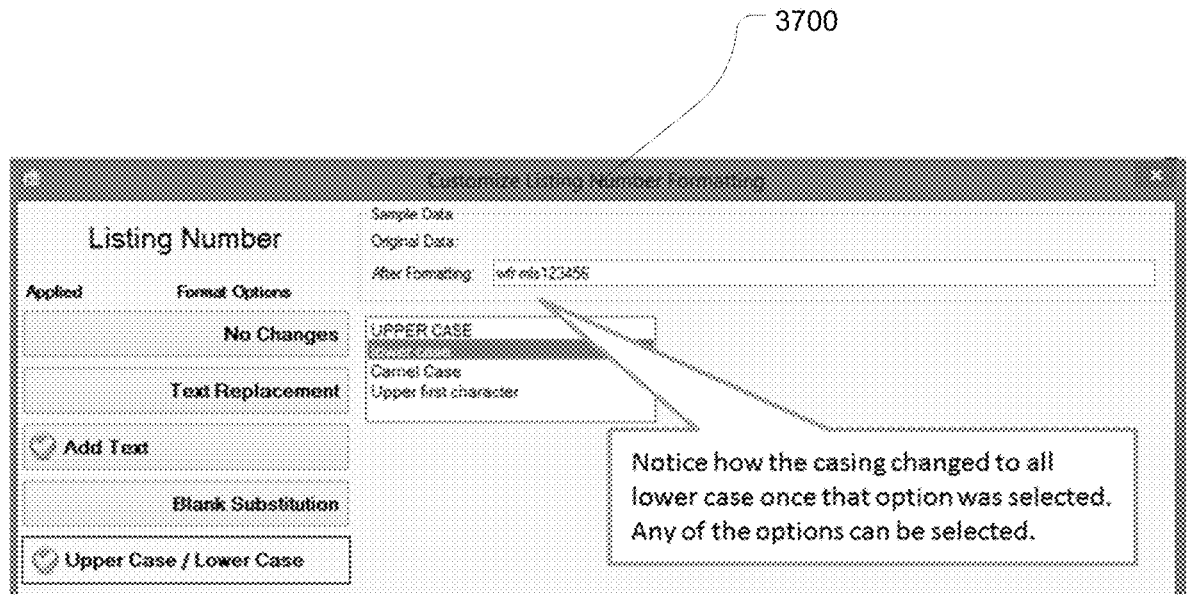
FIG. 37 illustrates the ability for a user to change the "case" status of the custom report in accordance with the principles and teachings of the disclosure.

Additionally FIG. 37 illustrates an embodiment of a formatting screen 3700 that the user can change the "case" status of the text by clicking on the Upper Case/Lower Case button. The end user may click first on the "Add Text" button and then may make the change in the "Text Before Data" box as shown. In the present implementation, the user:

1. Performed a "Text Replacement" function.
2. Added Text to the front of the number.
3. Then we changed to casing to reflect the desire of the end user.

It should be noted that all 3 functions are "layered" or "accumulated" on top of each other. In this implementation, as well as in other implementations, the order of the customization may not be important.

Figure 38:
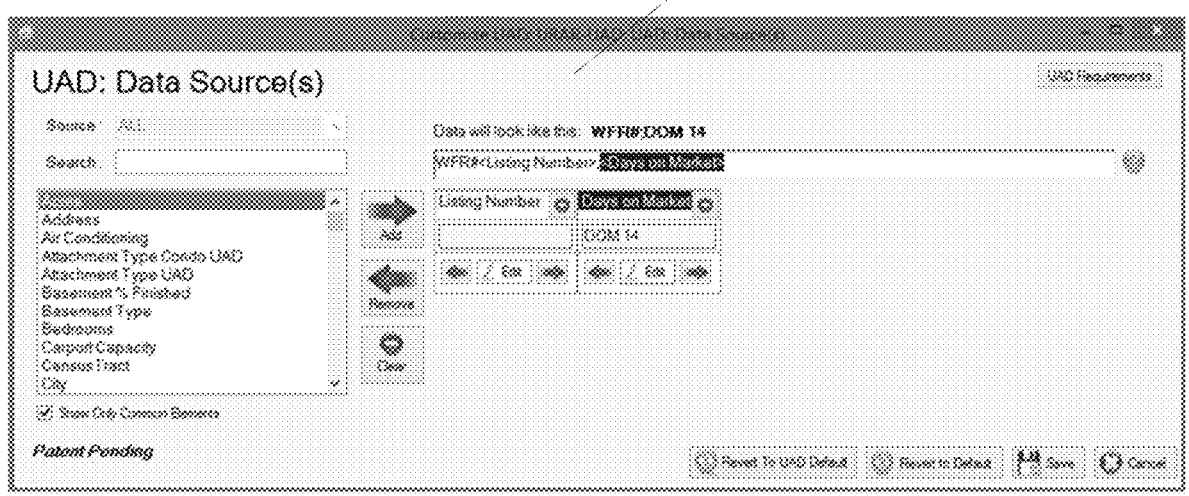
FIG. 38 illustrates the ability for a user to change the formatting of a custom report in accordance with the principles and teachings of the disclosure.

FIG. 38 illustrates an implementation of a formatting screen 3800 that once the user has completed the "Listing Number" formatting, it can append that information with other data from the database. In this case, the client (Fannie Mae) requires that the "Days On Market" be placed on the same line. In in the custom report generator engine, it appends the Listing Number data tag with the "Days on Market" data tag as shown.

Figure 39:
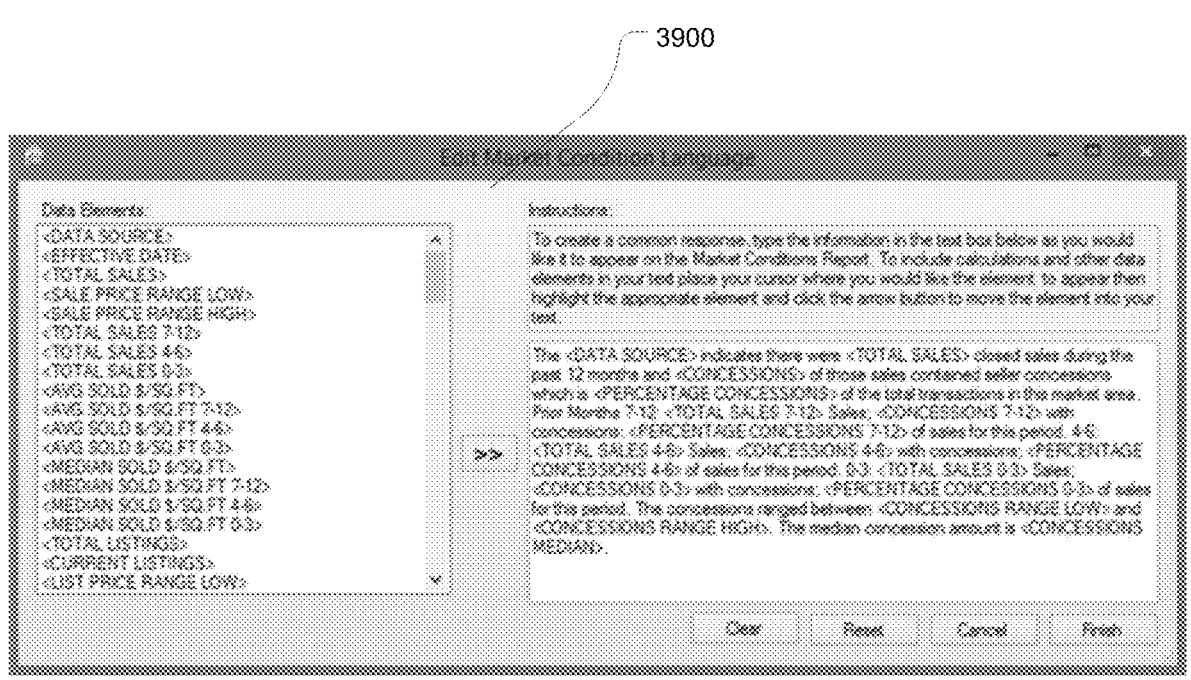
FIG. 39 illustrates an implementation of a custom report generator having the feature to combine any number of data tags and text together as desired by the end user in accordance with the principles and teachings of the disclosure.

FIG. 39 illustrates an implementation of a custom report generator screen 3900 having the feature to combine any number of data tags, or data that has been tagged or otherwise categorized, and text together as desired by the end user. This makes it possible to create sentences and paragraphs that utilize these data tags. The figure illustrates a sample of several sentences that were created by this process. The figure also illustrates the "set-up" function of building not only a sentence, but also the paragraph.

Figure 40:
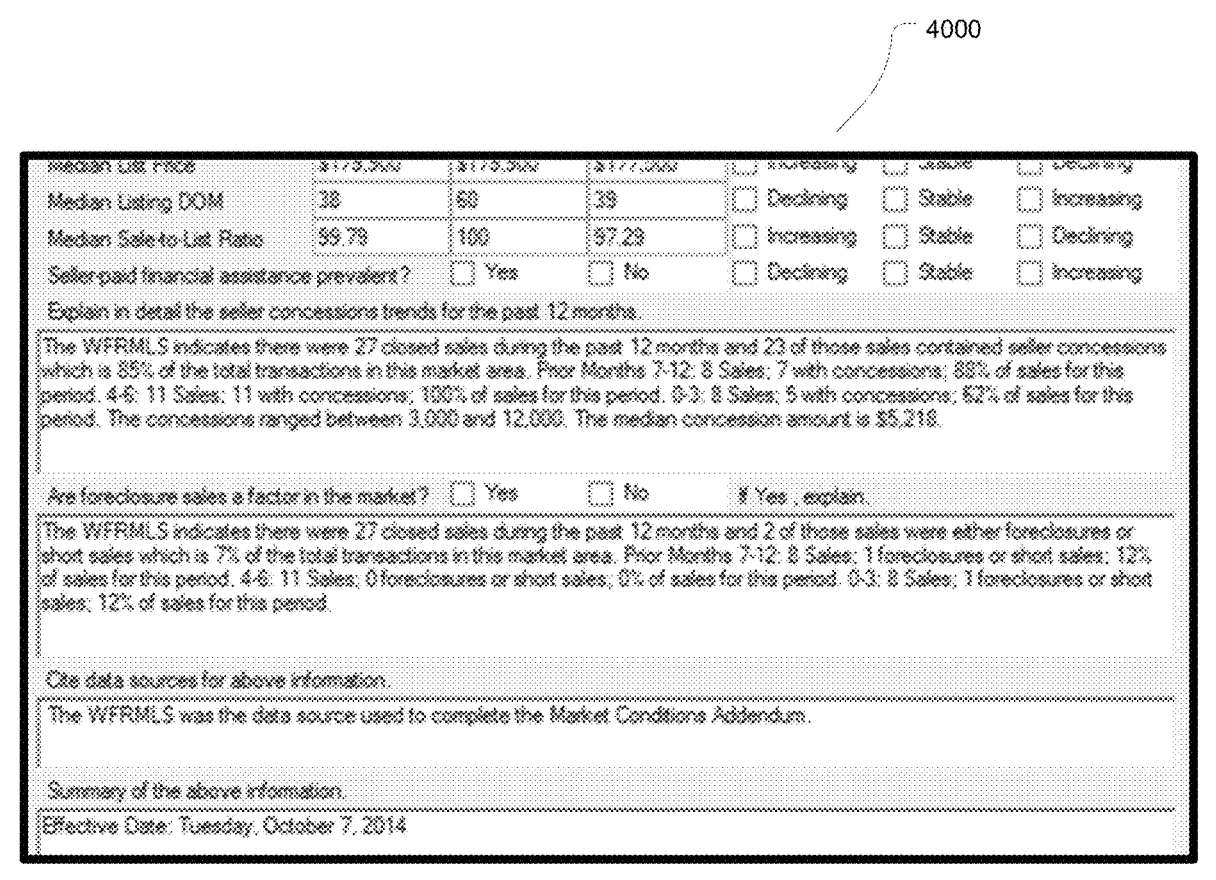

FIG. 40 illustrates an embodiment of an outputted custom report 4000 from the report generator. The illustrative screen shot shows exemplary results of what a customized paragraph looks like in the report that the system may output to a third party. In this particular report, there are two independent paragraphs that were created and two independent sentences below them.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method for converting real estate data stored in non-standardized data records into a plurality of electronic forms, each of the electronic forms having a plurality of data fields, the method comprising:
   generating a user interface;
   prompting a user to define, through the user interface, a profile for each of the plurality of electronic forms, each profile for the plurality of electronic forms comprising one or more rules for mapping the real estate data in the non-standardized data records into the data fields of an associated electronic form of the plurality of electronic forms;
   saving each profile as defined by the user in a computer memory;
   prompting the user to select, through the user interface, a first electronic form from the plurality of electronic forms;
   altering the real estate data from the non-standardized data records, in accordance with the profile associated with the first electronic form, into first altered real estate data to be mapped into the data fields of the first electronic form in accordance with the one or more rules of the profile associated with the first electronic form;
   automatically populating the data fields of the first electronic form with the first altered real estate data; and
   generating a report in accordance with the first electronic form;
   wherein one or more of the plurality of electronic forms comprise a standardized form passage comprising form text and one or more of the data fields;
   wherein, one or more of the data fields in the standardized form passage are each associated with a specific metric of the real estate data;
   wherein, the real estate data is altered in accordance with the one or more rules of the profile associated with the electronic form containing the standardized form passage such that specific metrics of the real estate data associated with the data fields in the standardized form passage are formatted to be populated into said data fields such that the standardized form passage becomes a complete narrative passage.

2. The method of claim 1, further comprising:
   prompting the user to select, through the user interface, a second electronic form from the plurality of electronic forms;
   altering the real estate data from the non-standardized data records, in accordance with the profile associated with the second electronic form, into second altered real estate data to be mapped into the data fields of the second electronic form in accordance with the one or more rules of the profile associated with the second electronic form;
   automatically populating the data fields of the second electronic form with the second altered real estate data; and
   generating a report in accordance with the second electronic form.

3. The method of claim 2, wherein the one or more rules of each of the profiles comprises translation rules.

4. The method of claim 3, wherein the one or more rules of each of the profiles further comprises formatting rules.

5. The method of claim 1, further comprising prompting the user to associate, through the user interface, source data in the non-standardized data records with the data fields in one of the electronic forms.

6. The method of claim 5, further comprising prompting the user to define, through the user interface, formatting rules for the source data.

7. The method of claim 6, wherein the formatting rules comprise a rule for appending text to the source data.

8. The method of claim 6, wherein the formatting rules comprise a rule changing an upper/lower case status of text in the source data.

9. The method of claim 6, wherein the formatting rules comprise a rule for converting a unit of measurement in the source data into another unit of measurement.

10. The method of claim 6, wherein the formatting rules comprise a rule for replacing text in the source data with other text.

11. The method of claim 6, wherein the formatting rules comprise a rule for prioritizing data in the source data over other data in the source data.

12. The method of claim 6, wherein the formatting rules comprise a first formatting rule and a second formatting rule, wherein the method comprises applying the first formatting rule to source data and then applying the second formatting rule to the same source data.

13. The method of claim 6, wherein the formatting rules comprise a rule for adding punctuation to the source data.

14. The method of claim 6, wherein the formatting rules comprise a rule for combining multiple data fields in the source data into a single data field.

15. A system for converting real estate data stored in non-standardized data records into a plurality of electronic forms, each of the electronic forms having a plurality of data fields, the system comprising:
a processor;
a memory coupled to the processor;
wherein the memory includes computer-readable instructions that, when executed by the processor, cause the processor to: generate a user interface prompt a user to define, through the user interface, a profile for each of the plurality of electronic forms, each profile for the plurality of electronic forms comprising one or more rules for mapping the real estate data in the non-standardized data records into the data fields of an associated electronic form of the plurality of electronic forms save each profile as defined by the user in the memory prompt the user to select, through the user interface, a first electronic form from the plurality of electronic forms alter the real estate data from the non-standardized data records, in accordance with the profile associated with the first electronic form, into first altered real estate data to be mapped into the data fields of the first electronic form in accordance with the one or more rules of the profile associated with the first electronic form automatically populate the data fields of the first electronic form with the first altered real estate data; and generate a report in accordance with the first electronic form;
wherein one or more of the plurality of electronic forms comprise a standardized form passage comprising form text and one or more of the data fields;
wherein, one or more of the data fields in the standardized form passage are each associated with a specific metric of the real estate data; and
wherein, the real estate data is altered in accordance with the one or more rules of the profile associated with the electronic form containing the standardized form passage such that specific metrics of the real estate data associated with the data fields in the standardized form passage are formatted to be populated into said data fields such that the standardized form passage becomes a complete narrative passage.

16. The system of claim 15, wherein the memory further comprises additional computer-readable instructions that, when executed by the processor, cause the processor to: prompt the user to select, through the user interface, a second electronic form from the plurality of electronic forms alter the real estate data from the non-standardized data records, in accordance with the profile associated with the second electronic form, into second altered real estate data to be mapped into the data fields of the second electronic form in accordance with the one or more rules of the profile associated with the second electronic form automatically populate the data fields of the second electronic form with information from the second altered real estate data; and generate a report in accordance with the second electronic form.

17. The system of claim 16, wherein the memory further comprises additional computer-readable instructions that, when executed by the processor, cause the processor to: prompt the user to associate, through the user interface, source data in the non-standardized data records with each of the data fields of one of the electronic forms.

18. The system of claim 17, wherein the memory further comprises additional computer-readable instructions that, when executed by the processor, cause the processor to: format text in the non-standardized data records.

19. The system of claim 15, wherein each of the profiles comprises translation rules.

20. The system of claim 15, wherein each of the profiles further comprises formatting rules.

* * * * *